US008234028B2

(12) United States Patent
Yamaguchi

(10) Patent No.: US 8,234,028 B2
(45) Date of Patent: Jul. 31, 2012

(54) HYBRID VEHICLE, CONTROL METHOD OF HYBRID VEHICLE, AND COMPUTER-READABLE RECORDING MEDIUM RECORDING PROGRAM FOR ALLOWING COMPUTER TO EXECUTE CONTROL METHOD

(75) Inventor: Katsuhiko Yamaguchi, Nisshin (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 524 days.

(21) Appl. No.: 12/311,966

(22) PCT Filed: Oct. 19, 2007

(86) PCT No.: PCT/JP2007/070871
§ 371 (c)(1),
(2), (4) Date: Apr. 21, 2009

(87) PCT Pub. No.: WO2008/065837
PCT Pub. Date: Jun. 5, 2008

(65) Prior Publication Data
US 2009/0277704 A1 Nov. 12, 2009

(30) Foreign Application Priority Data
Dec. 1, 2006 (JP) .................. 2006-326011

(51) Int. Cl.
*B60K 6/20* (2007.10)
(52) U.S. Cl. ...................................... 701/22
(58) Field of Classification Search ............... 701/22
See application file for complete search history.

(56) References Cited

U.S. PATENT DOCUMENTS

| 4,523,283 A | | 6/1985 | Muhlberger et al. | |
|---|---|---|---|---|
| 4,533,900 A | | 8/1985 | Muhlberger et al. | |
| 4,612,623 A | * | 9/1986 | Bazarnik | 702/177 |
| 4,739,482 A | * | 4/1988 | Wrigge | 701/30 |
| 5,819,201 A | * | 10/1998 | DeGraaf | 701/208 |
| 6,701,064 B1 | | 3/2004 | De Haan et al. | |
| 6,972,668 B2 | * | 12/2005 | Schauble | 340/438 |
| 7,325,638 B1 | * | 2/2008 | Belloso et al. | 180/69.6 |

(Continued)

FOREIGN PATENT DOCUMENTS
JP  Y2-63-1211  1/1988
(Continued)

OTHER PUBLICATIONS

Office Action issued in corresponding Russian Application No. 2009125049, dated Jul. 8, 2010. (with English-language translation).
(Continued)

*Primary Examiner* — Sarah B McPartlin
(74) *Attorney, Agent, or Firm* — Oliff & Berridge, PLC

(57) ABSTRACT

A hybrid vehicle has as a travel mode an EV mode for traveling while stopping the engine, and an HV mode for operating the engine. An ECU includes first and second traveling distance operating units, and a determination unit. The first traveling distance operating unit calculates an EV traveling distance indicative of a total traveling distance in the EV mode. The second traveling distance operating unit calculates the engine use traveling distance indicative of a total traveling distance when the engine is operated. The determination unit determines the necessity of maintenance of predetermined elements included in the vehicle based on the EV traveling distance and the engine use traveling distance.

24 Claims, 15 Drawing Sheets

U.S. PATENT DOCUMENTS 7,486,036 B2 * 2/2009 Oyobe et al. .......... 318/376

FOREIGN PATENT DOCUMENTS

| JP | A-6-165309 | 6/1994 |
|---|---|---|
| JP | A-8-19114 | 1/1996 |
| JP | A 2000-002626 | 1/2000 |
| JP | A-2000-199420 | 7/2000 |
| JP | A 2000-247164 | 9/2000 |
| JP | A-2003-189407 | 7/2003 |
| JP | A 2005-153682 | 6/2005 |
| JP | A 2005-227141 | 8/2005 |
| JP | A-2006-312353 | 11/2006 |
| RU | 2 178 585 C1 | 1/2002 |
| RU | 2 233 011 C2 | 9/2002 |

OTHER PUBLICATIONS

Extended Search Report issued in corresponding European Application No. 07830605.7, dated Aug. 20, 2010.

Office Action issued in corresponding Russian Application No. 2009125049, dated Oct. 1, 2010. (with English-language translation).

* cited by examiner

| ENGINE OUTPUT REQUIRED VALUE (kw) | P1 | P2 | ..... | Pn |
|---|---|---|---|---|
| VEHICLE SPEED (kw/h) | S1 | S2 | ..... | Sn |

HYBRID VEHICLE, CONTROL METHOD OF HYBRID VEHICLE, AND COMPUTER-READABLE RECORDING MEDIUM RECORDING PROGRAM FOR ALLOWING COMPUTER TO EXECUTE CONTROL METHOD

TECHNICAL FIELD

The present invention relates to a hybrid vehicle equipped with an internal combustion engine and a rotating electric machine serving as a mechanical power source for vehicle driving, having a first running mode during which the internal combustion engine is stopped and a second running mode during which the internal combustion engine is actuated. The present invention also relates to a control method of the hybrid vehicle.

BACKGROUND ART

Recently, attention has been given to a hybrid vehicle as an environmentally friendly vehicle. In addition to a conventional engine, the hybrid vehicle is equipped with a power storage device, an inverter, and a motor driven by the inverter, as a mechanical power supply for vehicle driving.

As one example of such a hybrid vehicle, there has been known a vehicle having a motor running mode during which the hybrid vehicle runs with an engine being stopped (hereinafter, such a mode is also referred to as an "EV mode" and a running mode during which the vehicle runs with the engine being actuated is also referred to as an "HV mode") (see, e.g., Japanese Patent Laying-Open No. 8-19114).

In the hybrid vehicle, however, the engine and components actuated in accordance with the actuation of the engine are not actuated in the EV mode. Consequently, there arises a problem that maintenance timings of the engine and the components related to the engine are not in keeping with actual use statuses when being determined from a total running distance or a total use time of the vehicle.

In a case of a hybrid vehicle capable of charging a power storage device through an external power supply (e.g., a system power supply), particularly, a running distance in an EV mode is extended. Consequently, it is impossible to accurately grasp use statuses of an engine and components related to the engine, based on a total running distance or a total use time of the vehicle.

DISCLOSURE OF THE INVENTION

The present invention has been devised to solve the problems described above, and an object thereof is to provide a hybrid vehicle capable of grasping use statuses of an engine and components related to the engine.

Another object of the present invention is to provide a control method of the hybrid vehicle in order to grasp the use statuses of the engine and the components related to the engine, and a computer-readable recording medium recording a program for allowing a computer to execute the control method.

According to the present invention, the hybrid vehicle is a hybrid vehicle equipped with an internal combustion engine and a rotating electric machine serving as a mechanical power source for vehicle driving, having a first running mode during which the internal combustion engine is stopped (an EV mode) and a second running mode during which the internal combustion engine is actuated (an IV mode). The hybrid vehicle includes first and second running amount computation units and a determination unit. The first running amount computation unit computes a first status amount indicating a running amount in the first running mode. The second running amount computation unit computes a second status amount indicating a running amount in the second running mode. The determination unit determines necessity of maintenance for elements included in the vehicle, based on the first and second status amounts.

Preferably, the determination unit determines necessity of maintenance for the internal combustion engine and the elements actuated in accordance with the actuation of the internal combustion engine among the elements in the vehicle, based on the second status amount, and determines necessity of maintenance for the remaining elements, based on a third status amount indicating a total running amount of the vehicle.

More preferably, the third status amount is calculated by addition of the second status amount to the first status amount.

Preferably, the first status amount is a total running distance in the first running mode. Moreover, the second status amount is a total running distance in the second running mode.

More preferably, the second running amount computation unit calculates the total running distance in the second running mode from an assumed speed set in accordance with a load of the internal combustion engine.

More preferably, the hybrid vehicle further includes a chargeable electric-power storage device and an electric-power generation device. The electric-power storage device stores electric power consumed by the rotating electric machine. The electric-power generation device is configured to be capable of charging the electric-power storage device through use of mechanical power of the internal combustion engine.

Also preferably, the first status amount is a total running time in the first running mode. Moreover, the second status amount is a total running time in the second running mode.

Preferably, the first running amount computation unit calculates the first status amount by subtraction of the second status amount from a third status amount indicating a total running amount of the vehicle.

Also preferably, the second running amount computation unit calculates the second status amount by subtraction of the first status amount from a third status amount indicating a total running amount of the vehicle.

Preferably, the hybrid vehicle further includes a memory unit which stores the first and second status amounts.

Preferably, the hybrid vehicle further includes a display unit which displays the first and second status amounts.

Preferably, the hybrid vehicle further includes a transmission unit which transmits the first and second status amounts to outside of the vehicle.

Preferably, the hybrid vehicle further includes a chargeable electric-power storage device which stores electric power consumed by the rotating electric machine. Herein, the electric-power storage device has such a capacity that the vehicle can run a distance of at least 10 km in the first running mode.

Preferably, the hybrid vehicle further includes a chargeable electric-power storage device, a plug which can be connected to a power supply external to a vehicle, and an electric-power charge device. Herein, the electric-power charge device is configured to be capable of receiving electric power from the plug, converting the electric power into voltage and charging the electric-power storage device.

More preferably, the hybrid vehicle further includes another rotating electric machine which is different from the rotating electric machine. Herein, each of the rotating electric machine and another rotating electric machine described above includes, as a stator winding, a star-connected multi-phase winding. The electric-power charge device includes first and second inverters, a pair of electric power lines, and a charge control unit. The first inverter is provided in correspondence with the rotating electric machine. The second inverter is connected to the first inverter in parallel and is provided in correspondence with another rotating electric machine described above. The pair of electric power lines connect the plug to a neutral point of the multi-phase winding of the rotating electric machine and a neutral point of the multi-phase winding of another rotating electric machine described above. The charge control unit controls the first and second inverters such that the first and second inverters convert electric power given to the neutral points from the power supply external to the vehicle through the pair of electric power lines into voltage to charge the electric-power storage device.

According to the present invention, moreover, the control method for the vehicle is a control method of a hybrid vehicle equipped with an internal combustion engine and a rotating electric machine serving as a mechanical power source for vehicle driving, having a first running mode during which the internal combustion engine is stopped and a second running mode during which the internal combustion engine is actuated. The control method includes a step of computing a first status amount indicating a running amount in the first running mode, a step of computing a second status amount indicating a running amount in the second running mode, and a step of determining necessity of maintenance for elements included in the vehicle, based on the first and second status amounts.

Preferably, in the step of determining the necessity of maintenance for the elements included in the vehicle, necessity of maintenance for the internal combustion engine and the elements actuated in accordance with the actuation of the internal combustion engine among the elements in the vehicle is determined based on the second status amount, and necessity of maintenance for the remaining elements is determined based on a third status amount indicating a total running amount of the vehicle.

More preferably, the third status amount is calculated by addition of the second status amount to the first status amount.

Preferably, the first status amount is a total running distance in the first running mode. Moreover, the second status amount is a total running distance in the second running mode.

More preferably, in the step of computing the second status amount, the total running distance in the second running mode is calculated from an assumed speed set in accordance with a load of the internal combustion engine.

Also preferably, the first status amount is a total running time in the first running mode. Moreover, the second status amount is a total running time in the second running mode.

Preferably, in the step of computing the first status amount, the first status amount is calculated by subtraction of the second status amount from a third status amount indicating a total running amount of the vehicle.

Also preferably, in the step of computing the second status amount, the second status amount is calculated by subtraction of the first status amount from a third status amount indicating a total running amount of the vehicle.

Preferably, the control method further includes a step of displaying the first and second status amounts.

Preferably, the control method further includes a step of transmitting the first and second status amounts to outside of the vehicle.

According to the present invention, moreover, the computer-readable recording medium records a program for allowing a computer to execute any of the control methods described above.

In the present invention, the hybrid vehicle can run in one of the first running mode during which the internal combustion engine is stopped (the EV mode) and the second running mode during which the internal combustion engine is actuated (the HV mode). The first status amount indicating the running amount in the first running mode (the EV mode) and the second status amount indicating the running amount in the second running mode (the HV mode) is computed, and the necessity of maintenance for the elements included in the vehicle is determined based on the computed first and second status amounts. Thus, the hybrid vehicle can discriminate elements degraded in accordance with the actuation of the internal combustion engine from elements degraded irrespective of the actuation of the internal combustion engine to determine the necessity of maintenance for each element.

According to the present invention, hence, a user can receive a notification about necessity of maintenance for each element included in the vehicle based on an actual use status.

BEST MODES FOR CARRYING OUT THE INVENTION

Figure 1:
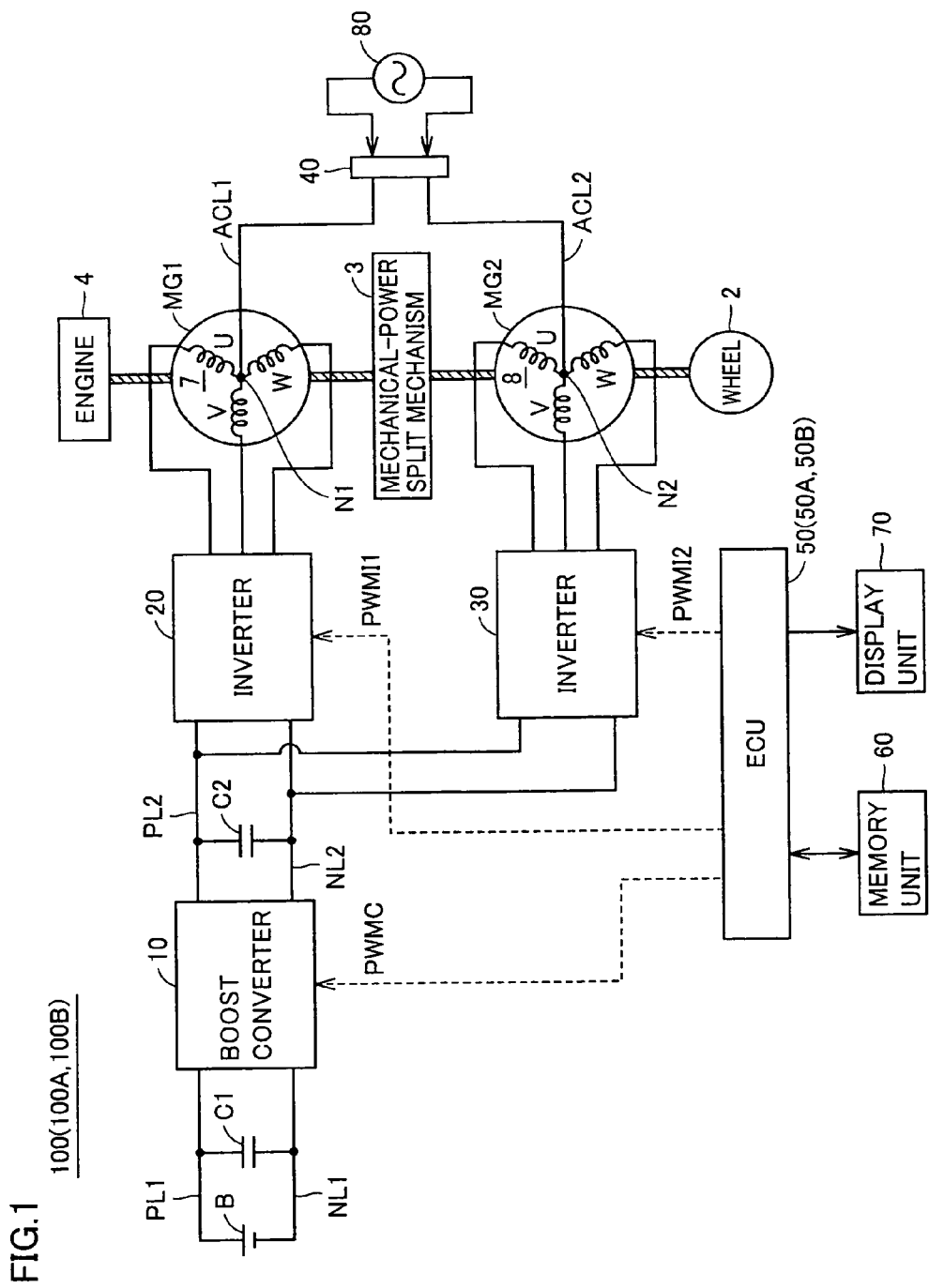
FIG. 1 shows a powertrain configuration of a hybrid vehicle according to Embodiment 1 of the present invention.

With reference to the drawings, hereinafter, detailed description will be given of embodiments of the present invention. In the drawings, identical or corresponding components are denoted by identical reference symbols; therefore, description thereof will not be given repeatedly.

Embodiment 1

FIG. 1 shows a powertrain configuration of a hybrid vehicle according to Embodiment 1 of the present invention. With reference to FIG. 1, hybrid vehicle 100 includes an engine 4, motor-generators MG1 and MG2, a mechanical-power split mechanism 3, and a wheel 2. Moreover, hybrid vehicle 100 also includes a power storage device B, a boost converter 10, inverters 20 and 30, positive polar lines PL1 and PL2, negative polar lines NL1 and NL2, and capacitors C1 and C2. Further, hybrid vehicle 100 also includes electric power lines ACL1 and ACL2, a charge plug 40, an ECU (Electronic Control Unit) 50, a memory unit 60, and a display unit 70.

Mechanical-power split mechanism 3 is coupled to engine 4, motor-generator MG1 and motor-generator MG2, and distributes mechanical power to engine 4, motor-generator MG1 and motor-generator MG2. For example, a planetary gear having three rotation shafts, that is, a sun gear, a planetary carrier and a ring gear can be used as mechanical-power split mechanism 3. These rotation shafts are connected to rotation shafts of engine 4, motor-generator MG1 and motor-generator MG2, respectively. For example, when a crank shaft of engine 4 passes through a center of a hollow rotor of motor-generator MG1, engine 4, motor-generator MG1 and motor-generator MG2 can be mechanically connected to mechanical-power split mechanism 3.

Mechanical power generated by engine 4 is distributed to wheel 2 and motor-generator MG1 by mechanical-power split mechanism 3. That is, engine 4 is incorporated in hybrid vehicle 100 as a mechanical-power source for driving wheel 2 and motor-generator MG1. Motor-generator MG1 is incorporated in hybrid vehicle 100 so as to act as a generator driven by engine 4 and to act as a motor capable of starting engine 4. Motor-generator MG2 is incorporated in hybrid vehicle 100 as a mechanical power source that drives wheel 2.

Power storage device B has a positive polar terminal connected to positive polar line PL1 and a negative polar terminal connected to negative polar line NL1. Capacitor C1 is connected between positive polar line PL1 and negative polar line NL1. Boost converter 10 is connected between positive and negative polar lines PL1, NL1 and positive and negative polar lines PL2, NL2. Capacitor C2 is connected between positive polar line PL2 and negative polar line NL2. Inverter 20 is connected between positive and negative polar lines PL2, NL2 and motor-generator MG1. Inverter 30 is connected between positive and negative polar lines PL2, NL2 and motor-generator MG2.

Motor-generators MG1 and MG2 include, as a stator coil, "Y"-connected three-phase coils 7 and 8, respectively. Three-phase coil 7 is connected to inverter 20, and has a neutral point N1 connected to electric power line ACL1. Three-phase coil 8 is connected to inverter 30, and has a neutral point N2 connected to electric power line ACL2.

Power storage device B is a chargeable DC power supply, for example, a nickel-hydrogen secondary power storage device or a lithium ion secondary power storage device. Power storage device B supplies DC power to boost converter 10. Moreover, power storage device B is charged by receiving electric power to be outputted from boost converter 10 to each of positive polar line PL1 and negative polar line NL1. Herein, a capacitor having a large capacity may be used as power storage device B. Capacitor C1 smoothes a variation in voltage between positive polar line PL1 and negative polar line NL1.

Based on a signal PWMC from ECU 50, boost converter 10 steps up the DC power outputted from power storage device B, and outputs the resultant power to positive polar line PL2. Based on signal PWMC, moreover, boost converter 10 steps down the electric power supplied from each of inverters 20 and 30 to a voltage level of power storage device B to charge power storage device B. Boost converter 10 is configured with a step-up/step-down chopper circuit, for example.

Capacitor C2 smoothes a variation in voltage between positive polar line PL2 and negative polar line NL2. Inverter 20 converts DC power supplied from each of positive polar line PL2 and negative polar line NL2 into AC power and outputs the AC power to motor-generator MG1, and inverter 30 converter converts DC power supplied from each of positive polar line PL2 and negative polar line NL2 into AC power and outputs the AC power to motor-generator MG2. Moreover, inverter 20 converts AC power generated by motor-generator MG1 into DC power and outputs as regenerative power the DC power to each of positive polar line PL2 and negative polar line NL2, and inverter 30 converts AC power generated by motor-generator MG2 into DC power and outputs as regenerative power the DC power to each of positive polar line PL2 and negative polar line NL2.

Herein, each of inverters 20 and 30 consists of a bridge circuit including switching elements corresponding to three phases, for example. Then, inverter 20 performs a switching operation in accordance with a signal PWMI1 from ECU 50 to drive motor-generator MG1, and inverter 30 performs a switching operation in accordance with a signal PWMI2 from ECU 50 to drive motor-generator MG2.

When power storage device B is charged by an external power supply 80 (e.g., a system power supply) connected thereto through charge plug 40, inverter 20 converts AC power given from external power supply 80 to neutral point N1 through electric power line ACL1 into DC power based on signal PWMI1 from ECU 50 and outputs the converted DC power to positive polar line PL2, and inverter 30 converts AC power given from external power supply 80 to neutral point N2 through electric power line ACL2 into DC power based on signal PWMI2 from ECU 50 and outputs the converted DC power to positive polar line PL2.

Each of motor-generators MG1 and MG2 is a three-phase AC motor, for example, a three-phase AC synchronization motor having a rotor into which a permanent magnet is embedded. Motor-generator MG1 generates three-phase AC power through use of mechanical power of engine 4, and outputs the generated three-phase AC power to inverter 20. Moreover, motor-generator MG1 receives three-phase AC power from inverter 20 to generate a driving force, and starts engine 4. Motor-generator MG2 receives three-phase AC power from inverter 30 to generate vehicle driving torque. Upon regenerative braking of the vehicle, moreover, motor-generator MG2 generates three-phase AC power and outputs the three-phase AC power to inverter 30.

ECU 50 generates a signal PWMC for driving boost converter 10, a signal PWMI1 for driving motor-generator MG1 and a signal PWMI2 for driving motor-generator MG2, and outputs signal PWMC, signal PWMI1 and signal PWMI2 to boost converter 10, inverter 20 and inverter 30, respectively.

Moreover, ECU 50 controls a running mode of hybrid vehicle 100. That is, ECU 50 controls switching between a running mode in which hybrid vehicle 100 runs through use of only motor-generator MG2 with engine 4 being stopped (an EV mode) and a mode in which hybrid vehicle 100 runs with engine 4 being actuated (an HV mode). Herein, the HV mode involves a case where the mechanical power from engine 4 is used only for electric power generation by motor-generator MG1.

When power storage device B is charged by external power supply 80, ECU 50 generates signals PWMI1, PWMI12 for controlling inverters 20, 30 to convert AC power, which is given from external power supply 80 to neutral points N1, N2 through charge plug 40 and electric power lines ACL1, ACL2 into DC power and outputs the DC power to positive polar line PL2.

Further, ECU 50 calculates an EV running distance indicating a total running distance in the EV mode, and an engine-used running distance indicating a total running distance in the HV mode, that is, a total running distance in a case where engine 4 is actuated, and outputs the EV running distance and the engine-used running distance to memory unit 60 and display unit 70, by a method to be described later.

Memory unit 60 is a rewritable nonvolatile memory, and stores the EV running distance and the engine-used running distance each calculated by ECU 50. Display unit 70 allows a user to visually recognize the EV running distance and the engine-used running distance each calculated by ECU 50 independently of each other.

Figure 2:
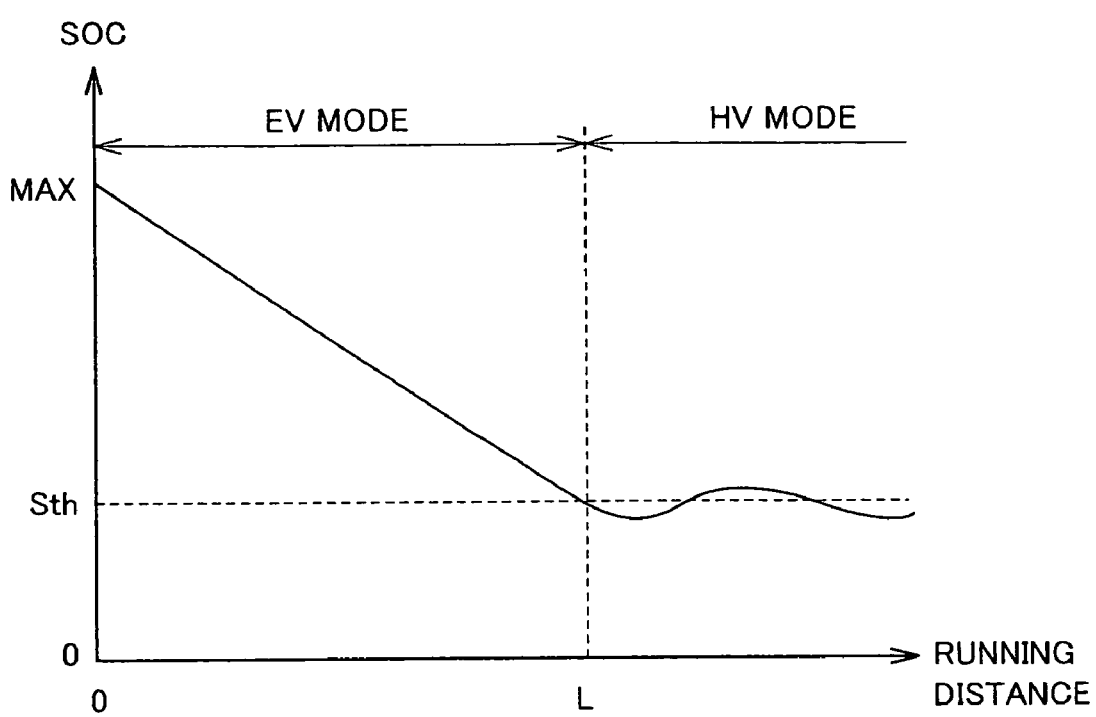
FIG. 2 shows a change in running mode of the hybrid vehicle shown in FIG. 1.

FIG. 2 shows a change in running mode of hybrid vehicle 100 shown in FIG. 1. With reference to FIG. 2, it is assumed that hybrid vehicle 100 starts to run after power storage device B has been fully charged by external power supply 80. Until a state of charge (hereinafter, abbreviated as "SOC") of power storage device B falls below a predetermined value Sth, engine 4 is stopped as long as hybrid vehicle 100 does not accelerate abruptly or run on a slope. That is, hybrid vehicle 100 runs in the EV mode. During a period that hybrid vehicle 100 runs in the EV mode, the SOC of power storage device B is not managed particularly. As the running distance is increased, the SOC of power storage device B is reduced.

When the SOC of power storage device B falls below value Sth, engine 4 is started and the running mode is switched from the EV mode to the HV mode. During a period that hybrid vehicle 100 runs in the HV mode, motor-generator MG1 generates electric power through use of mechanical power of engine 4. Thus, a changing/discharging operation of power storage device B is managed such that the SOC of power storage device B approximates value Sth.

Although not shown in the figure, also in the period that hybrid vehicle 100 runs in the EV mode, the SOC of power storage device B can be increased by regenerative power from motor-generator MG2 upon regenerative braking of the vehicle. In the HV mode, moreover, the charging/discharging operation of power storage device B may be managed such that the SOC of power storage device B falls within a predetermined range in which value Sth is defined as a center of control.

As described above, hybrid vehicle 100 capable of charging power storage device B through use of external power supply 80 can start to run in the EV mode in a full-charge state. Therefore, a running distance L of hybrid vehicle 100 in the EV mode becomes longer than that of a hybrid vehicle having no external charging function. Since the running distance of hybrid vehicle 100 in the EV mode is extended, power storage device B has such a capacity that hybrid vehicle 100 in the full-charge state can run a distance of at least 10 km or more in the EV mode.

Herein, when running distance L in the EV mode is extended, the running distance in the HV mode is relatively decreased. Depending on a use status of the vehicle (e.g., a case where the vehicle is mainly used in a small area), there arises a possibility that engine 4 is actuated hardly. Like a conventional technique, consequently, it is impossible to grasp, from only a total running distance, use statuses of engine 4 and components actuated in accordance with actuation of engine 4. In Embodiment 1, the EV running distance and the engine-used running distance are computed as the running distance of the vehicle, respectively. The EV running distance allows a user to be conscious of economy running, and the engine-used running distance allows the user to grasp the use statuses of engine 4 and the components related to engine 4.

Figure 3:
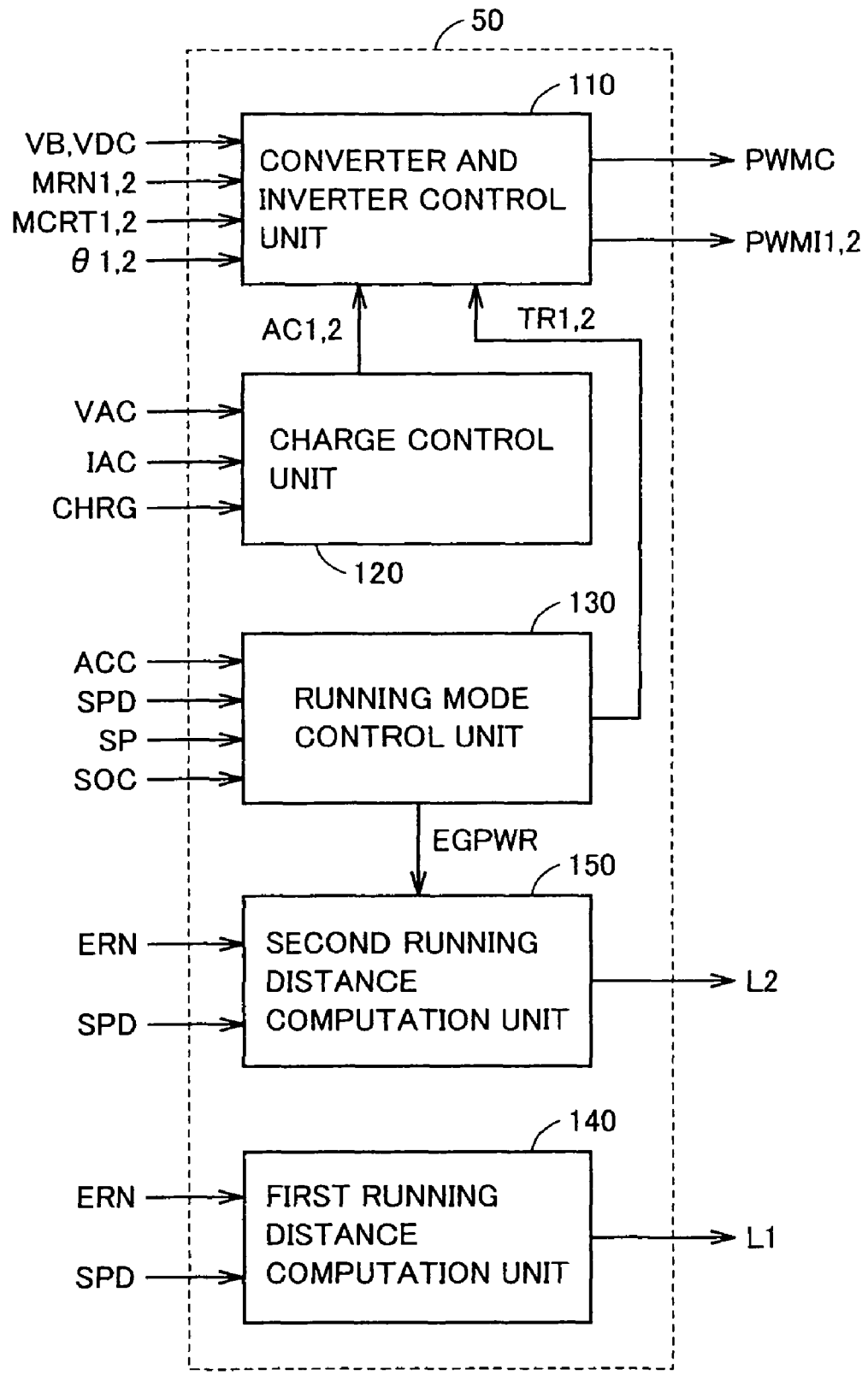
FIG. 3 shows a functional block diagram of an ECU shown in FIG. 1.

FIG. 3 shows a functional block diagram of ECU 50 shown in FIG. 1. With reference to FIG. 3, ECU 50 includes a converter and inverter control unit 110, a charge control unit 120, a running mode control unit 130, a first running distance computation unit 140 and a second running distance computation unit 150.

Converter and inverter control unit 110 receives, from a sensor (not shown), detected values of a voltage VB of power storage device B, a voltage VDC between positive polar line PL2 and negative polar line NL2, and rotation speeds MRN1 and MRN2 of motor-generators MG1 and MG2. Moreover, converter and inverter control unit 110 receives torque command values TR1 and TR2 of motor-generators MG1 and MG2 from running mode control unit 130. Based on the respective signals, then, converter and inverter control unit 110 generates a PWM (Pulse Width Modulation) signal for driving boost converter 10, and outputs the generated PWM signal as a signal PWMC to boost converter 10.

Moreover, converter and inverter control unit 110 receives, from a sensor (not shown), detected values of a motor current MCRT1 and a motor rotation angle θ1 of motor-generator MG1. Based on the signals of voltage VDC, motor current MCRT1, motor rotation angle θ1 and torque command value TR1, then, converter and inverter control unit 110 generates a PWM signal for driving motor-generator MG1, and outputs the generated PWM signal as a signal PWMI1 to inverter 20. Similarly, converter and inverter control unit 110 generates a PWM signal for driving motor-generator MG2, and outputs the generated PWM signal as a signal PWMI2 to inverter 30.

Herein, when power storage device B is charged by external power supply 80, converter and inverter control unit 110 generates signals PWMI1 and PWMI2 based on zero-phase voltage commands AC1 and AC2 from charge control unit 120, respectively, and outputs signals PWMI1 and PWMI2 to inverters 20 and 30, respectively.

When a signal CHRG indicating a command to charge power storage device B from external power supply 80 is activated, charge control unit 120 generates zero-phase voltage commands AC1 and AC2 for allowing motor-generators MG1 and MG2 and inverters 20 and 30 to act as a single-phase PWM converter, based on a voltage VAC and a current IAC of AC power given from external power supply 80 to neutral points N1 and N2, and outputs zero-phase voltage commands AC1 and AC2 to converter and inverter control unit 110. Herein, signal CHRG is activated when the user issues a command to start the charging operation in a state that charge plug 40 is connected to external power supply 80, for example.

Running mode control unit 130 receives detected values of an accelerator press-down degree ACC, a vehicle speed SPD and a shift position SP from a sensor (not shown) and, also, receives an estimated value of the SOC of power storage device B from a battery ECU (not shown). Based on the respective signals, then, running mode control unit 130 determines whether or not engine 4 is actuated during the period that hybrid vehicle 100 runs, that is, determines whether hybrid vehicle 100 runs in the EV mode or the HV mode, by a method to be described later. Based on a result of the determination, running mode control unit 130 generates torque command values TR1 and TR2, and outputs torque command values TR1 and TR2 to converter and inverter control unit 110. Herein, running mode control unit 130 outputs, to second running distance computation unit 150, an engine output required value EGPWR calculated in a computing process.

First running distance computation unit 140 calculates an EV running distance indicating a total running distance in the EV mode. More specifically, first running distance computation unit 140 integrates a vehicle speed SPD from a vehicle speed sensor to calculate a running distance at the time when it is determined that engine 4 is not actuated. Then, first running distance computation unit 140 outputs, as an EV running distance L1, the calculated running distance to each of memory unit 60 and display unit 70.

Second running distance computation unit 150 calculates an engine-used running distance L2 indicating a total running distance obtained by actuation of engine 4. Herein, second running distance computation unit 150 does not simply calculate the running distance using vehicle speed SPD detected by the vehicle speed sensor, but calculates engine-used running distance L2 in consideration of a load of engine 4. More specifically, second running distance computation unit 150 determines an assumed vehicle speed in accordance with the load of engine 4 based on engine output required value EGPWR from running mode control unit 130, using a vehicle speed conversion map to be described later, and integrates the assumed vehicle speed to calculate engine-used running distance L2. Then, second running distance computation unit 150 outputs engine-used running distance L2 to each of memory unit 60 and display unit 70. Herein, when it is determined that engine 4 is not actuated under the load, based on engine output required value EGPWR, second running distance computation unit 150 calculates engine-used running distance L2 using vehicle speed SPD from the vehicle speed sensor.

Figure 4:
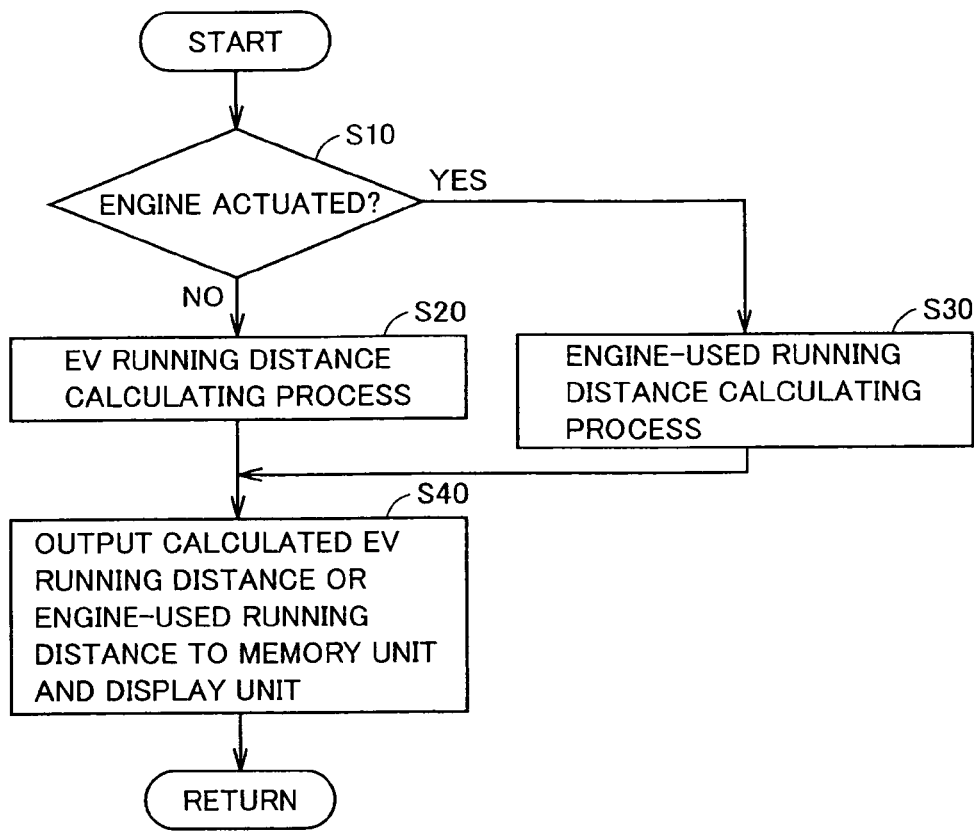
FIG. 4 shows a flowchart concerning a running distance computing process executed by the ECU shown in FIG. 1.

FIG. 4 shows a flowchart concerning a running distance computing process executed by ECU 50 shown in FIG. 1. Herein, the process in this flowchart is executed while being called from a main routine at every predetermined period of time or each time a predetermined condition is established.

With reference to FIG. 4, ECU 50 determines whether or not engine 4 is actuated (step S10). For example, ECU 50 can determine whether or not engine 4 is actuated, based on whether or not engine 4 is subjected to combustion control or injection control. In the configuration of hybrid vehicle 100, since engine 4 does not rotate in conjunction with the rotation of an axle in the EV mode (engine 4 is stopped by the inertia thereof, and motor-generator MG1 rotates in conjunction with the rotation of the axle), ECU 50 may determine whether or not engine 4 is actuated, based on whether or not engine 4 rotates.

If it is determined that engine 4 is not actuated (NO in step S10), ECU 50 executes an EV running distance calculating process to calculate an EV running distance L1 (step S20). On the other hand, if it is determined that engine 4 is actuated in step S10 (YES in step S10), ECU 50 executes an engine-used running distance calculating process to calculate an engine-used running distance L2 (step S30). It is to be noted that the EV running distance calculating process and the engine-used running distance calculating process will be described later.

Then, ECU 50 outputs EV running distance L1 calculated in step S20 and engine-used running distance L2 calculated in step S30 to each of memory unit 60 and display unit 70 (step S40).

Figure 5:
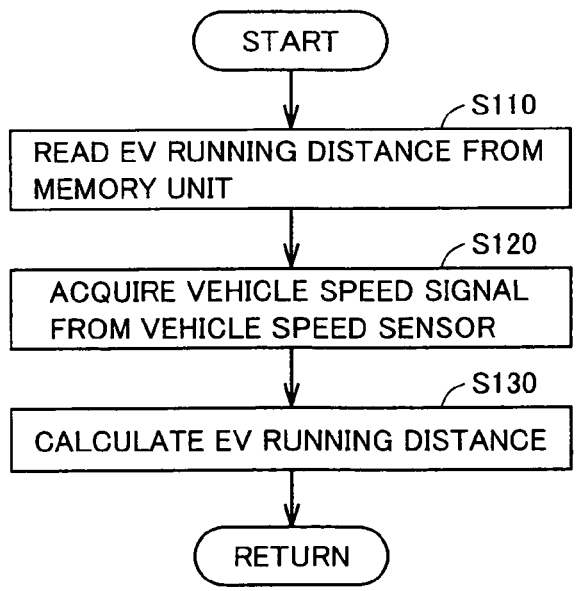
FIG. 5 shows a flowchart of an EV running distance calculating process shown in FIG. 4.

FIG. 5 shows a flowchart of the EV running distance calculating process shown in FIG. 4. With reference to FIG. 5, ECU 50 reads EV running distance L1 from memory unit 60 (step S110). Next, ECU 50 acquires a detected value of vehicle speed SPD from the vehicle speed sensor (step S120). Next, ECU 50 calculates EV running distance L1 based on the detected value of vehicle speed SPD (step S130). Specifically, ECU 50 adds an integrated value of vehicle speed SPD to EV running distance L1 to calculate EV running distance L1.

Figure 6:
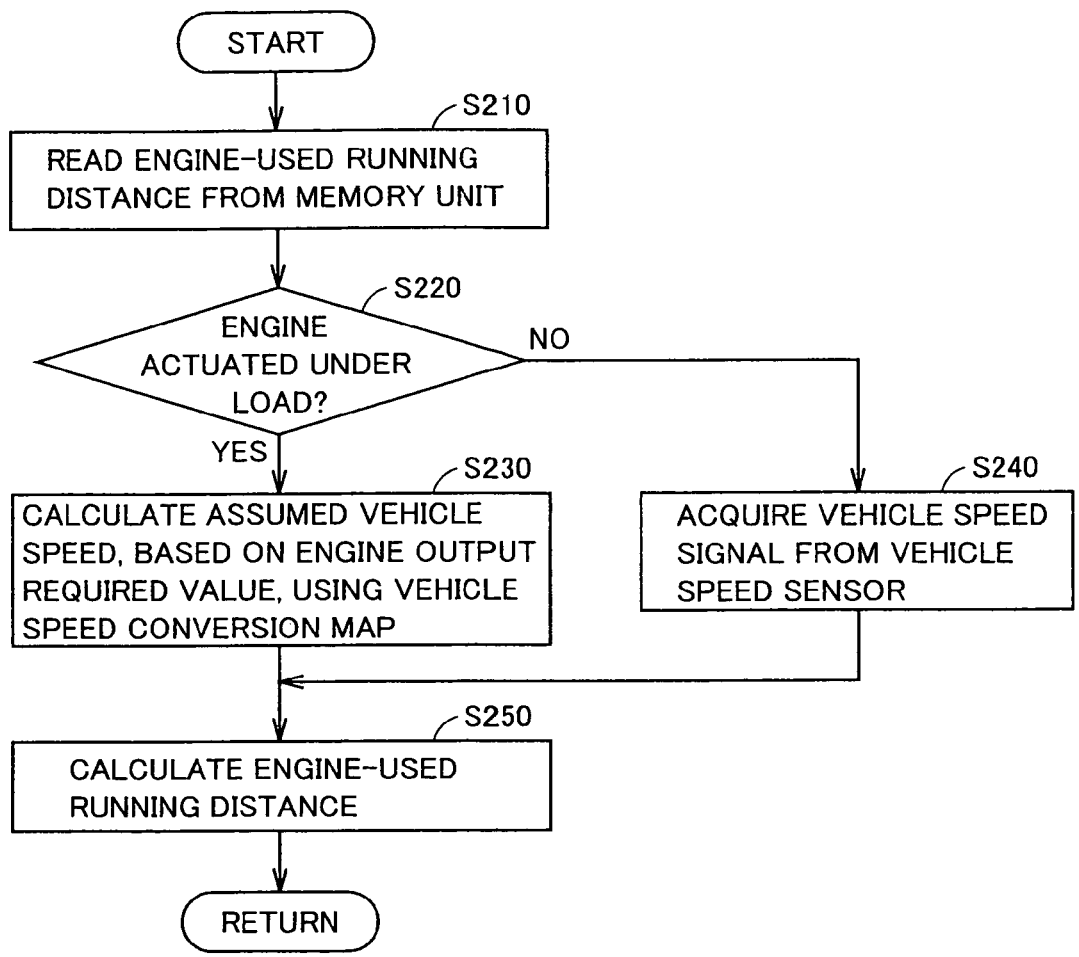
FIG. 6 shows a flowchart of an engine-used running distance calculating process shown in FIG. 4.

FIG. 6 shows a flowchart of the engine-used running distance calculating process shown in FIG. 4. With reference to FIG. 6, ECU 50 reads engine-used running distance L2 from memory unit 60 (step S210). Next, ECU 50 determines whether or not engine 4 is actuated under the load (step S220). For example, ECU 50 can determine whether or not engine 4 is actuated under the load, based on whether or not engine output required value EGPWR is zero.

If it is determined that engine 4 is actuated under the load (YES in step S220), ECU 50 calculates an assumed vehicle speed of the vehicle, based on engine output required value EGPWR, using the vehicle speed conversion map obtained in advance (step S230).

Figures 7, 8:
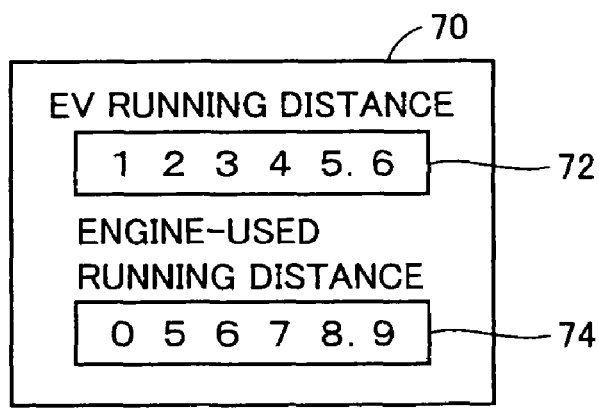
FIG. 7 shows a vehicle speed conversion map.
FIG. 8 shows one example of a display state of a display unit shown in FIG. 1.

FIG. 7 shows the vehicle speed conversion map. With reference to FIG. 7, a vehicle speed conversion value is defined for each engine output required value indicating the load of engine 4, and an assumed vehicle speed is obtained in accordance with engine output required value EGPWR. This assumed vehicle speed is provided for appropriately determining the use status of engine 4. In hybrid vehicle 100, the output from engine 4 is partly or entirely used for electric power generation by motor-generator MG1. Consequently, even when vehicle speed SPD from the vehicle speed sensor is integrated during the period that engine 4 is actuated, the use status of engine 4 is not appropriately reflected on engine-used running distance L2 (e.g., engine 4 is sometimes actuated for electric power generation during a period that hybrid vehicle 100 stops.) In order to avoid this disadvantage, engine-used running distance L2 is calculated from the assumed vehicle speed determined in accordance with the load of engine 4, so that the use status of engine 4 can be given to the user appropriately.

Upon calculation of the vehicle speed conversion map, a relation between a vehicle speed and power required for achieving the vehicle speed is obtained from a running resistance model of the vehicle, for example. Herein, the running resistance varies depending on a vehicle weight (including a passenger weight) and a road gradient. Therefore, the vehicle speed conversion map may be corrected based on the weight including the passenger weight and the road gradient.

With reference to FIG. 6 again, if it is determined in step S220 that engine 4 is not actuated under the load (NO in step S220), ECU 50 acquires the detected value of vehicle speed SPD from the vehicle speed sensor (step S240). In a state that engine 4 is actuated although engine output required value EGPWR is zero, that is, in an idling state or a fuel saving state, the detected value of vehicle speed SPD is used in place of the assumed vehicle speed corresponding to the load of the engine.

When engine 4 is actuated under the load, ECU 50 integrates the assumed vehicle speed corresponding to the load of engine 4 to calculate engine-used running distance L2. On the other hand, when engine 4 is actuated without load, ECU 50 integrates vehicle speed SPD from the vehicle speed sensor to calculate engine-used running distance L2 (step S250).

FIG. 8 shows one example of a display state of display unit 70 shown in FIG. 1. With reference to FIG. 8, display unit 70 displays EV running distance L1 on a region 72 and, also, displays engine-used running distance L2 on a region 74. That is, display unit 70 displays the total running distance in the EV mode and the total running distance in the HV mode, that is, the total running distance in the state that engine 4 is actuated, independently of each other. Herein, display unit 70 may selectively display one of EV running distance L1 and engine-used running distance L2, in accordance with a requirement from the user. Alternatively, display unit 70 may display a total running distance of the vehicle in addition to EV running distance L1 and engine-used running distance L2.

EV running distance L1 and engine-used running distance L2 are calculated and displayed as described above, so that the user can recognize the total running distance in each running mode and, also, can appropriately judge the use statuses of engine 4 and the components related to engine 4, based on engine-used running distance L2.

Figure 9:
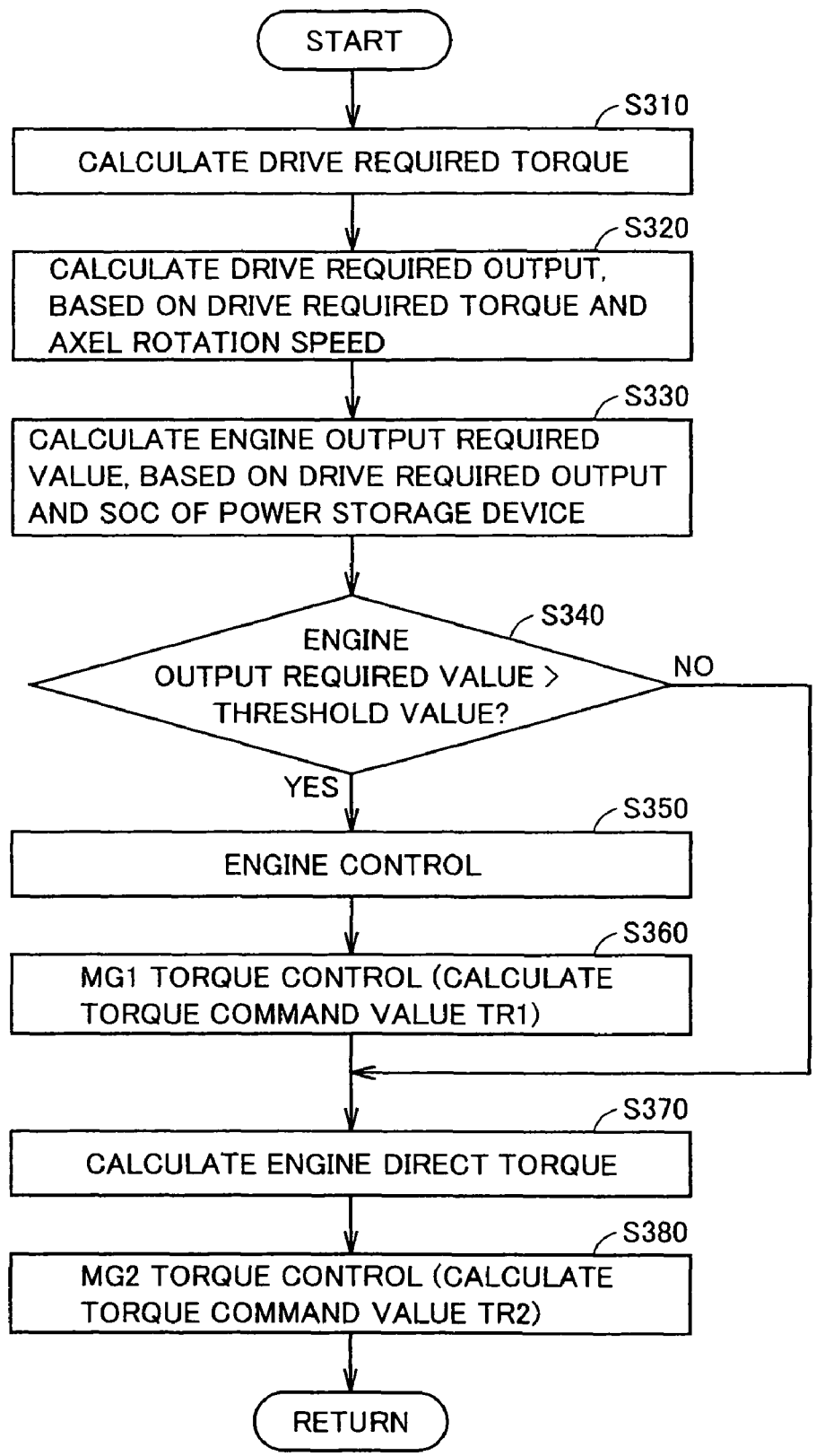
FIG. 9 shows a flowchart for illustration of a control structure of a running mode control unit shown in FIG. 3.

FIG. 9 shows a flowchart for illustration of a control structure of running mode control unit 130 shown in FIG. 3. It is to be noted that the process in this flowchart is also executed while being called from a main routine at every predetermined period of time or each time a predetermined condition is established.

With reference to FIG. 9, running mode control unit 130 calculates drive required torque (axel) of the vehicle using a preset map or an arithmetic equation, based on an accelerator press-down degree, a vehicle speed and a shift position (step S310). Next, running mode control unit 130 calculates a drive required output of the vehicle, based on the calculated drive required torque and an axle rotation speed (step S320). Specifically, running mode control unit 130 multiplies the drive required torque by the axel rotation speed to calculate the drive required output.

Next, running mode control unit 130 calculates engine output required value EGPWR, based on the calculated drive required output and the SOC of power storage device B (step S330). Specifically, running mode control unit 130 calculates a charge required amount of power storage device B, based on the SOC of power storage device B, and adds the charge required amount to the drive required output to calculate engine output required value EGPWR. Next, running mode control unit 130 determines whether or not engine output required value EGPWR is larger than a predetermined threshold value (step S340). This threshold value is used for determining whether or not engine 4 should be actuated. In other words, this threshold value is a running mode switching threshold value.

If it is determined in step S340 that engine output required value EGPWR is equal to or less than the threshold value (NO in step S340), the processing proceeds to subsequent step S370. On the other hand, if it is determined in step S340 that engine output required value EGPWR is larger than the threshold value (YES in step S340), running mode control unit 130 calculates a target rotation speed of engine 4 and actually performs control of engine 4 (step S350). Next, running mode control unit 130 calculates a target rotation speed of motor-generator MG1 in order to maintain the rotation speed of engine 4 at the target rotation speed and, also, calculates a torque command value TR1 for setting the rotation speed of motor-generator MG1 at the target rotation speed (step S360).

Next, running mode control unit 130 calculates generated torque of engine 4 (engine direct torque) from torque command value TR1 of motor-generator MG1 (step S370). Herein, the engine direct torque can be calculated from torque command value TR1, based on a geometric configuration (a gear ratio) of mechanical-power split mechanism 3. If engine output required value EGPWR is equal to or less than the threshold value, engine 4 is stopped; therefore, the engine direct torque becomes zero. Next, when the engine direct torque is calculated, running mode control unit 130 subtracts the engine direct torque from the drive required torque calculated in step S310 to calculate a torque command value TR2 of motor-generator MG2 (step S380).

Next, description will be given of operations of inverters 20 and 30 at the time when power storage device B is charged by external power supply 80.

Figure 10:
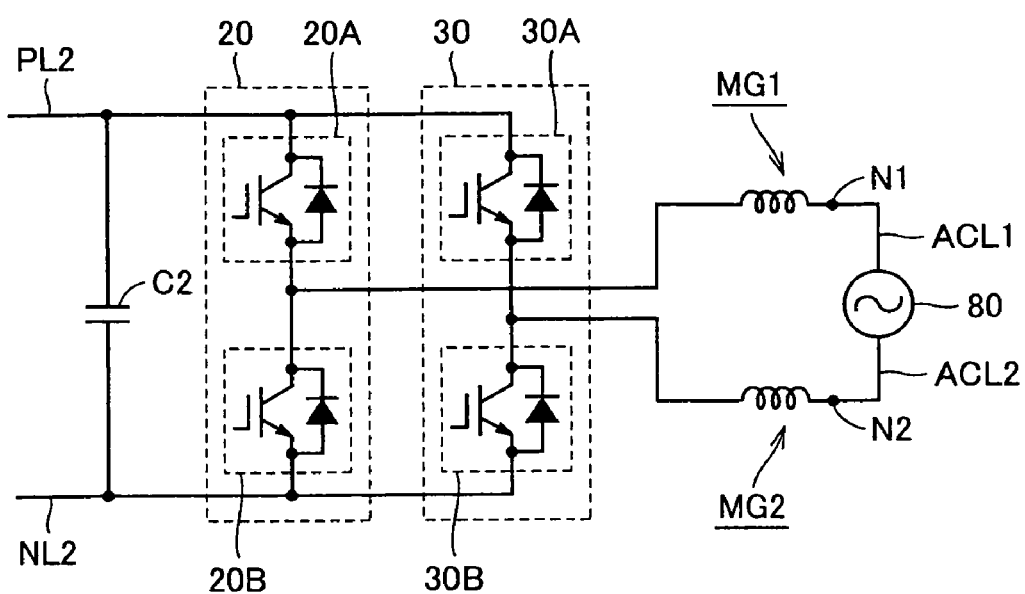
FIG. 10 shows zero-phase equivalent circuitry of inverters and motor-generators shown in FIG. 1.

FIG. 10 shows zero-phase equivalent circuitry of inverters 20, 30 and motor-generators MG1, MG2 shown in FIG. 1. In respective inverters 20 and 30 each of which consists of a three-phase bridge circuit, there are eight patterns as combinations of an ON state and an OFF state of six switching elements. Two of the eight switching patterns have a zero interphase voltage, and such a voltage state is referred to as a zero-voltage vector. With regard to the zero-voltage vector, it can be regarded that three switching elements of an upper arm are in a single switching state (all the switching elements are turned on or off.) Moreover, it can also be regarded that three switching elements of a lower arm are in a single switching state. In FIG. 10, accordingly, three switching elements of an upper arm of inverter 20 are collectively shown as an upper arm 20A and three switching elements of a lower arm of inverter 20 are collectively shown as a lower arm 20B. Similarly, three switching elements of an upper arm of inverter 30 are collectively shown as an upper arm 30A and three switching elements of a lower arm of inverter 30 are collectively shown as a lower arm 30B.

As shown in FIG. 10, this zero-phase equivalent circuitry can be regarded as a single-phase PWM converter that receives single-phase AC power given to each of neutral points N1 and N2 through electric power lines ACL1 and ACL2. Therefore, the zero-voltage vector is changed in each of inverters 20 and 30, and the switching operation is controlled such that inverters 20 and 30 act as arms of a single-phase PWM converter. Thus, AC power to be inputted through each of electric power lines ACL1 and ACL2 is converted into DC power and the DC power is outputted to positive polar line PL2.

In hybrid vehicle 100 according to Embodiment 1, as described above, power storage device B can be charged by external power supply 80 for the purpose of extending a running area in the EV mode. In the hybrid vehicle having the external charging function, if the frequency of actuation of engine 4 is reduced, the use status of engine 4 can not be grasped based on the total running distance and total use time of the vehicle. According to Embodiment 1, however, engine-used running distance L2 is calculated and displayed for the user. According to Embodiment 1, thus, the use statuses of engine 4 and the components related to engine 4 can be given to the user.

Moreover, display unit 70 displays EV running distance L1 and engine-used running distance L2. According to Embodiment 1, therefore, the total running distance for each running mode can be given to the user.

In Embodiment 1, further, engine-used running distance L2 is calculated from the assumed vehicle speed corresponding to the load of engine 4. According to Embodiment 1, thus, the use status of engine 4 can be given to the user in consideration of the load status.

In Embodiment 1, furthermore, the charging power from charge plug 40 is supplied to neutral points N1 and N2 of motor-generators MG1 and MG2 and is incorporated in motor-generators MG1 and MG2 through inverters 20 and 30. According to Embodiment 1, thus, there is no necessity of additional provision of an inverter dedicated to electric charge.

In the foregoing description, EV running distance L1 is calculated in such a manner that vehicle speed SPD from the vehicle speed sensor is integrated at the time when it is determined that engine 4 is not actuated. Alternatively, EV running distance L1 may be a value obtained by subtracting engine-used running distance L2 from the total running distance of the vehicle which is calculated by integrating vehicle speed SPD from the vehicle speed sensor irrespective of a fact that engine 4 is actuated or is not actuated. Moreover, engine-used running distance L2 may be a value obtained by subtracting, from the total running distance of the vehicle, EV running distance L1 calculated by integrating vehicle speed SPD from the vehicle speed sensor at the time when it is determined that engine 4 is not actuated. That is, two of three distances, that is, the total running distance of the vehicle, EV running distance L1 and engine-used running distance L2 may be calculated by integration while the remaining one may be calculated based on the calculated two distances.

Embodiment 2

Conventionally, a maintenance timing of each element that forms a vehicle has been determined based on a total running distance of the vehicle. In Embodiment 2, on the other hand, maintenance timings of an engine 4 and elements actuated in accordance with actuation of engine 4 are determined based on an engine-used running distance L2.

A hybrid vehicle 100A according to Embodiment 2 is equal in general configuration to hybrid vehicle 100 shown in FIG. 1.

Figure 11:
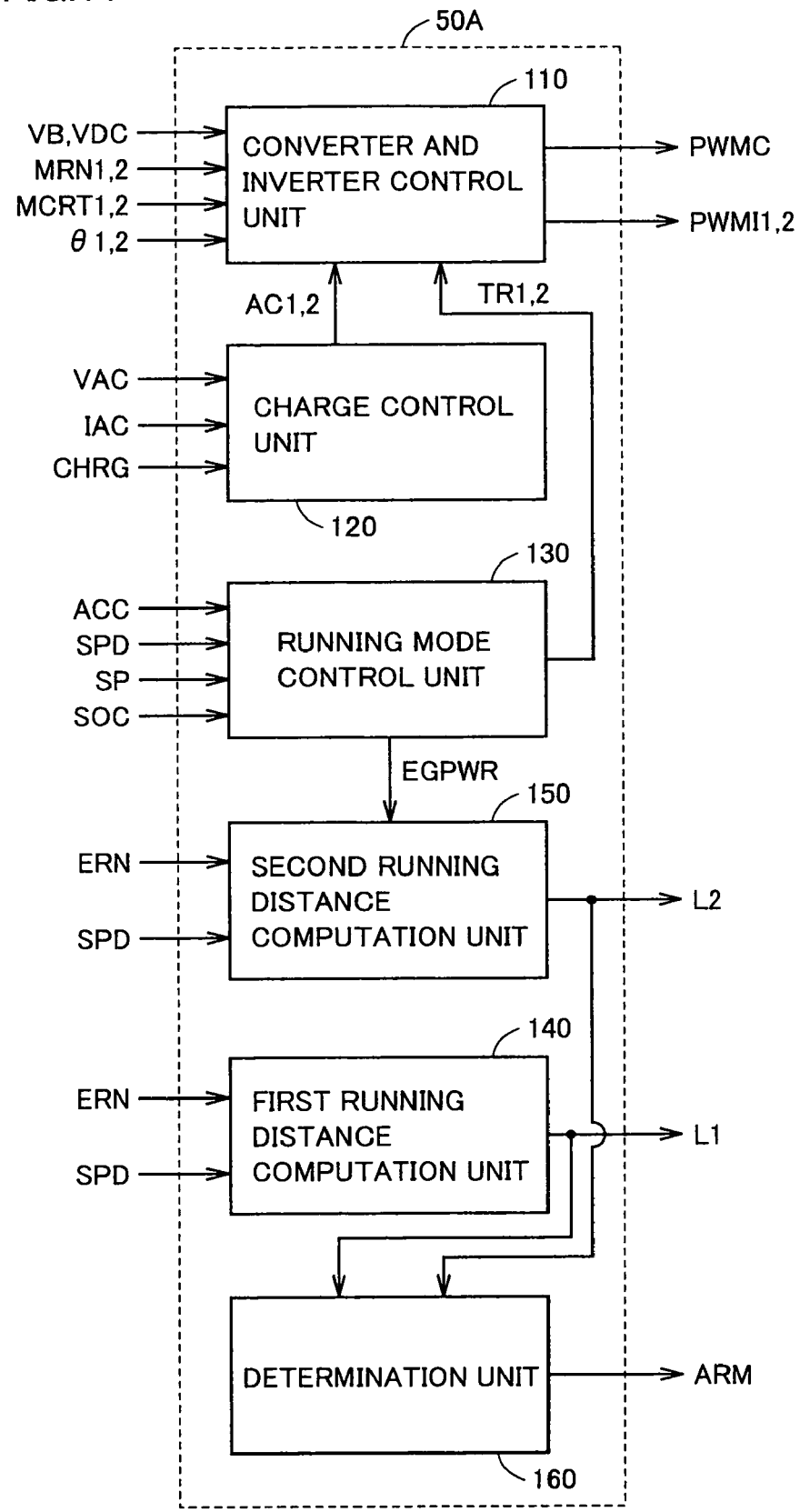
FIG. 11 shows a functional block diagram of an ECU according to Embodiment 2.

FIG. 11 shows a functional block diagram of an ECU 50A according to Embodiment 2. With reference FIG. 11, ECU 50A further includes a determination unit 160 in addition to the configuration of ECU 50 shown in FIG. 3.

Determination unit 160 receives an EV running distance L1 from a first running distance computation unit 140 and, also, receives an engine-used running distance L2 from a second running distance computation unit 150. Based on a total running distance L3 of the vehicle, which is obtained by adding engine-used running distance L2 to EV running distance L1, and engine-used running distance L2, then, determination unit 160 determines necessity of maintenance for predetermined elements included in the vehicle. Moreover, determination unit 160 generates a signal ARM for issuing a notification about an element requiring maintenance to a user. Herein, examples of the element in the vehicle include components making up the vehicle, and necessities allowing the vehicle to run, such as an engine oil and an engine coolant. Herein, total running distance L3 of the vehicle may be calculated separately using a vehicle speed SPD from a vehicle speed sensor.

Herein, determination unit 160 can output signal ARM to a display unit 70. Based on signal ARM, then, display unit 70 allows the user to visually recognize the element requiring maintenance.

Figure 12:
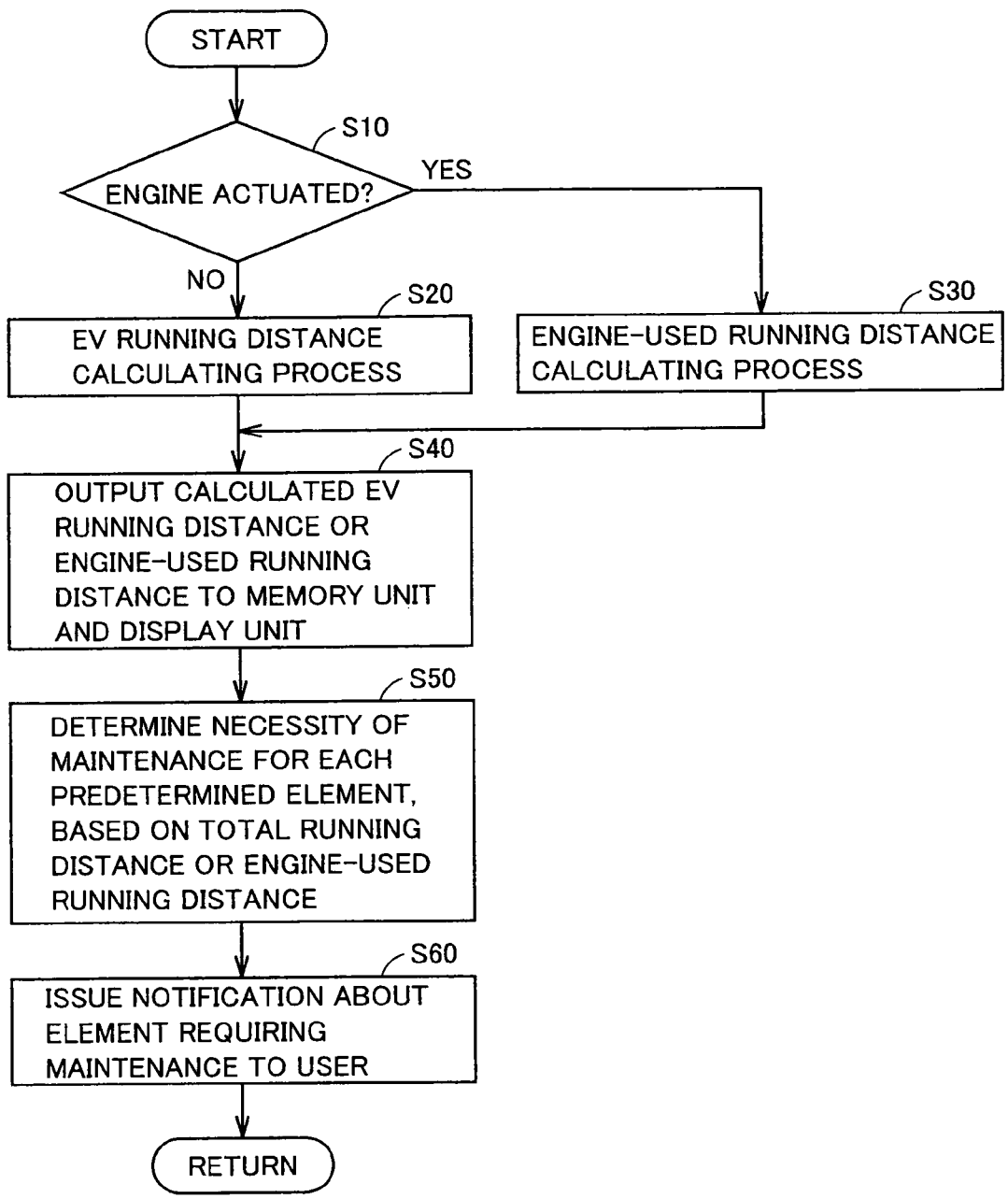
FIG. 12 shows a flowchart concerning a maintenance timing determining process executed by the ECU according to Embodiment 2.

FIG. 12 shows a flowchart concerning a maintenance timing determining process executed by ECU 50A according to Embodiment 2. With reference to FIG. 12, this flowchart further includes steps S50 and S60 in addition to the steps of the flowchart shown in FIG. 4. That is, after execution of a process in step S40, ECU 50A determines necessity of maintenance for each predetermined element included in the vehicle, based on total running distance L3 of the vehicle or engine-used running distance L2 (step S50).

More specifically, a running distance for specifying a maintenance timing is set for each predetermined element. Further, one of total running distance L3 and engine-used running distance L2 is set for determining necessity of maintenance, for each element.

For example, exchanging timings of the respective elements such as a wiper, an engine oil, an engine oil filter and an engine coolant and a tire rotation timing are set in accordance with a running distance. ECU 50A determines the exchanging timing of the wiper and the tire rotation timing, each of which does not pertinent to the actuation of engine 4, based on total running distance L3. On the other hand, ECU 50A determines the exchanging timings of the elements actuated in accordance with the actuation of engine 4, such as the engine oil, the engine oil filter and the engine coolant, based on engine-used running distance L2.

When ECU 50A determines the necessity of maintenance for each element in step S50, then, ECU 50A generates a signal ARM for issuing a notification about the element requiring maintenance to the user (step S60).

Although not shown in the figure, the user may set an element that requires a notification about a maintenance timing. Further, the user may set a maintenance timing (a running distance) and one of total running distance L3 and engine-used running distance L2 for determination of necessity of maintenance, for each element set by the user.

In Embodiment 2, as described above, the necessity of maintenance is determined based on engine-used running distance L2 with regard to engine 4 and the elements actuated in accordance with the actuation of engine 4. According to Embodiment 2, thus, the user can receive the notification about the necessity of maintenance for each element based on an actual use status.

Embodiment 3

In Embodiment 1, EV running distance L1 and engine-used running distance L2 of the hybrid vehicle are calculated. In Embodiment 3, on the other hand, a total running time in an EV mode and a total running time in an HV mode (i.e., a total actuation time of an engine 4) are calculated. A user can also grasp use statuses of engine 4 and components related to engine 4, from the total running time in the HV mode.

A hybrid vehicle 100B according to Embodiment 3 is equal in general configuration to hybrid vehicle 100 shown in FIG. 1.

Figure 13:
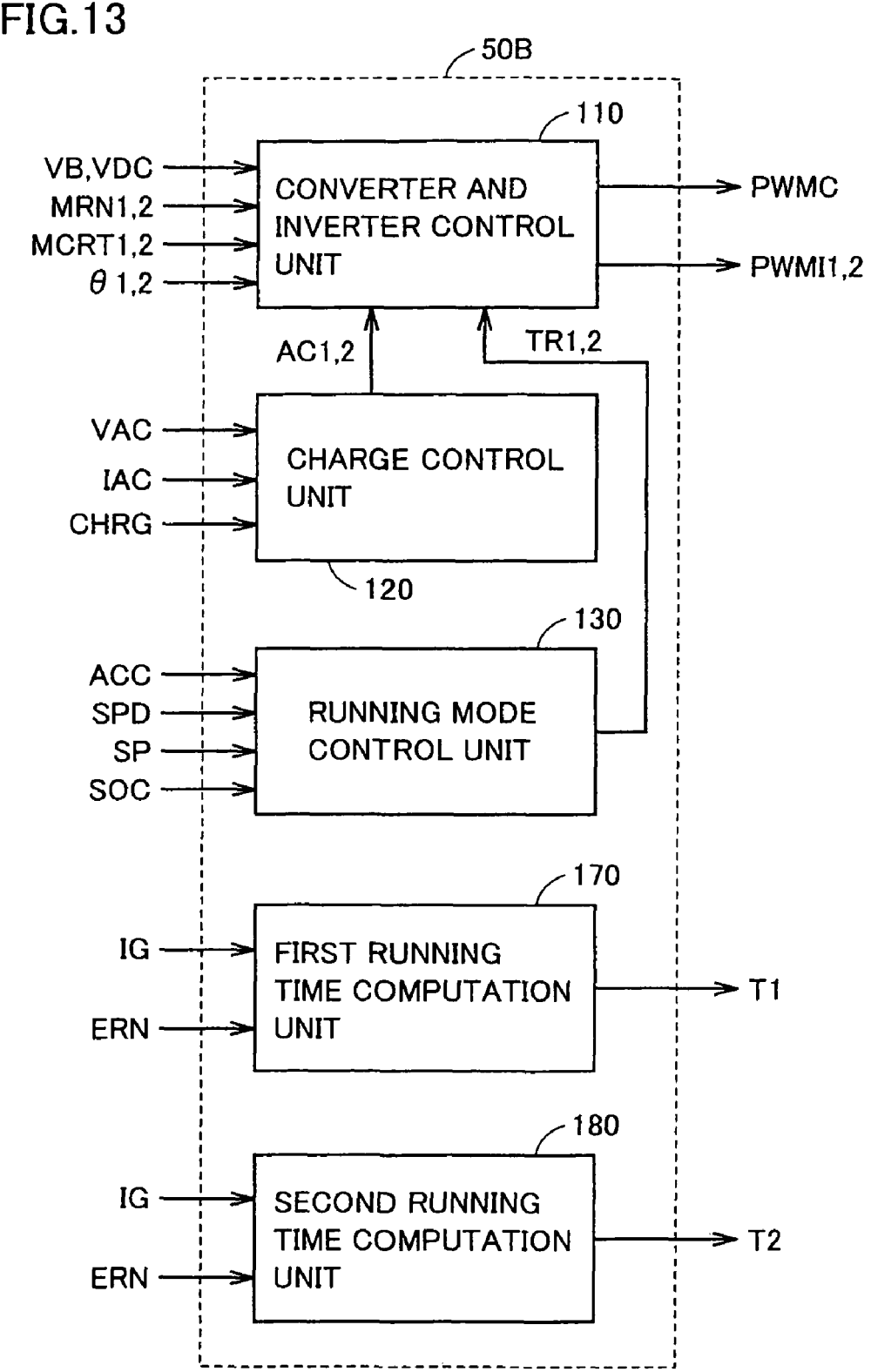
FIG. 13 shows a functional block diagram of an ECU according to Embodiment 3.

FIG. 13 shows a functional block diagram of an ECU 50B according to Embodiment 3. With reference to FIG. 13, ECU 50B includes a first running time computation unit 170 and a second running time computation unit 180 in place of first running distance computation unit 140 and second running distance computation unit 150 in the configuration of ECU 50 shown in FIG. 3.

First running time computation unit 170 calculates an EV running time T1 indicating the total running time in the EV mode. Specifically, first running time computation unit 170 integrates a time, at which it is determined that engine 4 is not actuated, during a period of activation of a vehicle system. Then, first running time computation unit 170 outputs the integrated time as EV running time T1 to each of a memory unit 60 and a display unit 70. Herein, it is determined whether or not the vehicle system is activated, based on a signal IG indicating a system activation state of the vehicle.

Second running time computation unit 180 calculates an HV running time T2 indicating the total running time in the HV mode. Specifically, second running time computation unit 180 integrates a time, at which it is determined that engine 4 is actuated, during the period of activation of the vehicle system. Then, second running time computation unit 180 outputs the integrated time as HV running time T2 to each of memory unit 60 and display unit 70.

Figure 14:
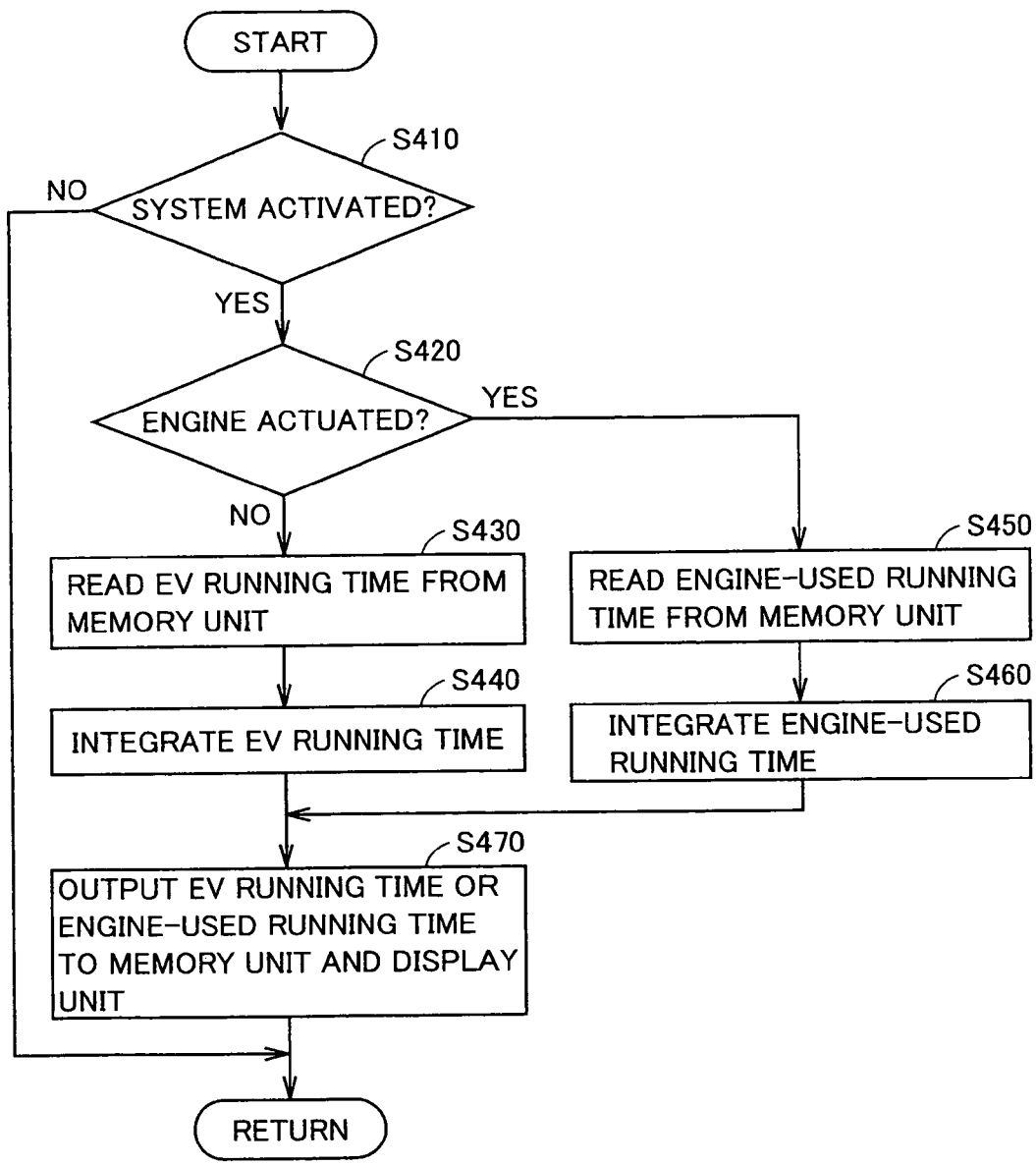
FIG. 14 shows a flowchart concerning a running time computing process executed by the ECU according to Embodiment 3.

FIG. 14 shows a flowchart concerning a running time computing process executed by ECU 50B according to Embodiment 3. Herein, the process in this flowchart is also executed while being called from a main routine at every predetermined period of time or each time a predetermined condition is established.

With reference to FIG. 14, ECU 50B determines whether or not the vehicle system is activated, based on a signal IG (step S410). If it is determined that the vehicle system is activated (YES in step S410), ECU 50B determines whether or not engine 4 is actuated (step S420).

If it is determined that engine 4 is not actuated (NO in step S420), ECU 50B reads EV running time T1 from memory unit 60 (step 430), and integrates EV running time T1 (step S440).

On the other hand, if it is determined in step S420 that engine 4 is actuated (YES in step S420), ECU 50B reads HV running time T2 from memory unit 60 (step S450), and integrates HV running time T2 (step S460).

Next, ECU 50B outputs EV running time T1 calculated in step S440 and HV running time T2 calculated in step S460 to each of memory unit 60 and display unit 70 (step 470).

In Embodiment 3, as described above, HV running time T2 indicating the actual actuation time of engine 4 is calculated, and the user can recognize HV running time T2. According to Embodiment 3, thus, the use statuses of engine 4 and the components related to engine 4 can be given to the user.

Moreover, display unit 70 displays EV running time T1 and HV running time T2. According to Embodiment 3, therefore, the total running time for each running mode can be given to the user.

In the foregoing description, EV running time T1 and HV running time T2 are integrated in accordance with a fact that engine 4 is actuated or is not actuated. Alternatively, HV running time T2 may be a value obtained by subtracting EV running time T1 from the total running time of the vehicle calculated by integration of the time, at which the system is activated, irrespective of the fact that engine 4 is actuated or is not actuated. Moreover, EV running time T1 may be a value obtained by subtracting HV running time T2 from the total running time of the vehicle. In other words, two of three times, that is, the total running time of the vehicle, EV running time T1 and HV running time T2 may be calculated by time integration while the remaining one may be calculated based on the calculated two running times.

Embodiment 4

In Embodiment 4, when a power storage device B is charged by an external power supply 80, an EV running distance L1 and an engine-used running distance L2, each of which is stored in a memory unit 60, are transmitted from a charge plug 40 to an external device through an electric power line.

Figure 15:
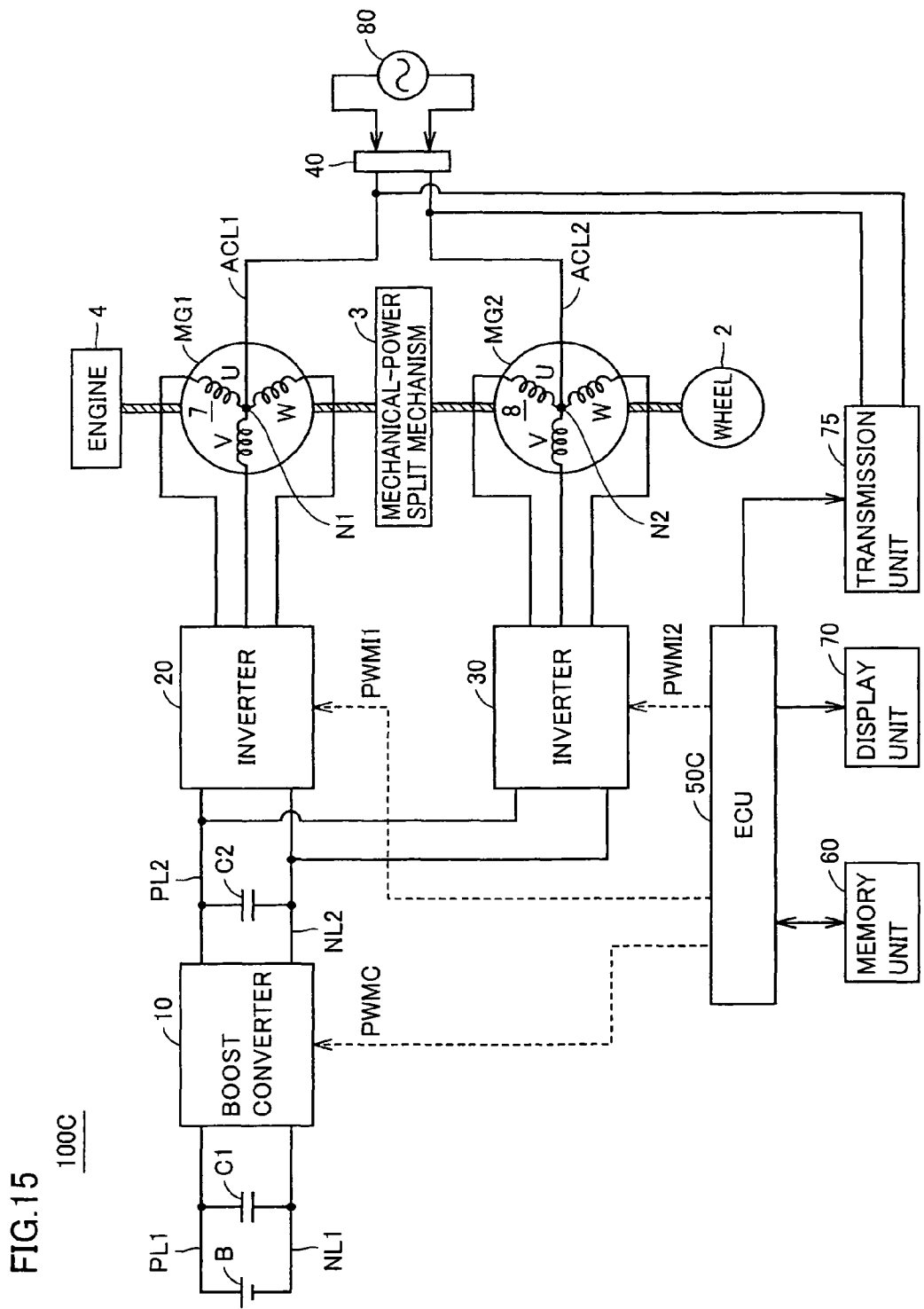
FIG. 15 shows a powertrain configuration of a hybrid vehicle according to Embodiment 4.

FIG. 15 shows a powertrain configuration of a hybrid vehicle according to Embodiment 4. With reference to FIG. 15, hybrid vehicle 100C further includes a transmission unit 75 in addition to the configuration of hybrid vehicle 100 shown in FIG. 1, and includes an ECU 50C in place of ECU 50 in the configuration of hybrid vehicle 100 shown in FIG. 1.

Transmission unit 75 is connected to electric power lines ACL1 and ACL2. Transmission unit 75 is a transmitter capable of establishing communications through an electric power line, for example, a modem. Moreover, transmission unit 75 reads EV running distance L1 and engine-used running distance L2 from memory unit 60, based on a command from ECU 50C, and transmits the read data to an external device through electric power lines ACL1 and ACL2 and charge plug 40. Herein, transmission unit 75 transmits EV running distance L1 and engine-used running distance L2 to a server which is installed at a dealer and allows establishment of communications using an electric power line, for example.

When power storage device B is charged by external power supply 80, ECU 50C reads EV running distance L1 and engine-used running distance L2 from memory unit 60, and outputs to transmission unit 75 a command to transmit the data to the external device. Herein, the remaining functions of ECU 50C are equal to those of ECU 50 according to Embodiment 1.

Figure 16:
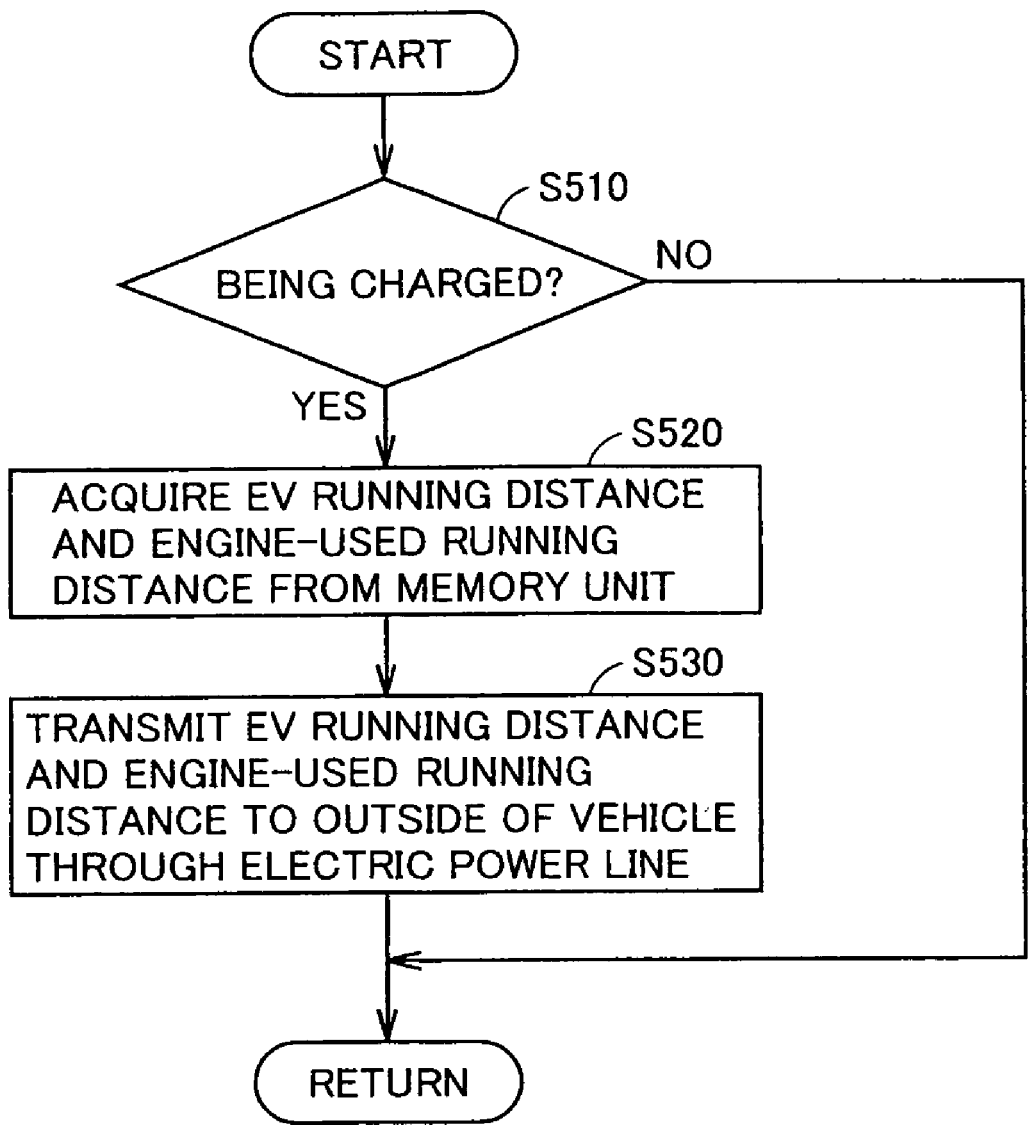
FIG. 16 shows a flowchart concerning a transmitting process executed by an ECU shown in FIG. 15.

FIG. 16 shows a flowchart concerning a transmitting process executed by ECU 50C shown in FIG. 15. With reference to FIG. 16, ECU 50C determines whether or not power storage device B is charged by external power supply 80, based on a signal CHRG (step S510). If it is determined that power storage device B is charged by external power supply 80 (YES in step S510), ECU 50C acquires EV running distance L1 and engine-used running distance L2 from memory unit 60 (step S520).

Next, ECU 50C transmits EV running distance L1 and engine-used running distance L2 from charge plug 40 to the external device through electric power lines ACL1 and ACL2 (step S530).

According to Embodiment 3, as described above, EV running distance L1 and engine-used running distance L2 are transmitted to the external device. Therefore, when EV running distance L1 and engine-used running distance L2 are transmitted to, for example, a server which is installed at a dealer and allows establishment of communications using an electric power line, the dealer can manage a maintenance timing of the relevant vehicle.

According to Embodiment 3, moreover, at the time when power storage device B is charged by external power supply 80, EV running distance L1 and engine-used running distance L2 are transmitted to the external device through the electric power line. Therefore, there arises no necessity of provision of a typically expensive radio transmitter.

Although not shown in the figure, transmission unit 75 may be provided to the hybrid vehicle according to Embodiment 2. Herein, transmission unit 75 may transmit EV running time T1 and HV running time T2 to an external device at the time when power storage device B is charged by external power supply 80.

In the respective embodiments described above, when power storage device B is charged by external power supply 80, the charging electric power is received at neutral points N1 and N2 of motor-generators MG1 and MG2. Alternatively, a dedicated inverter for charging may be provided separately.

Figure 17:
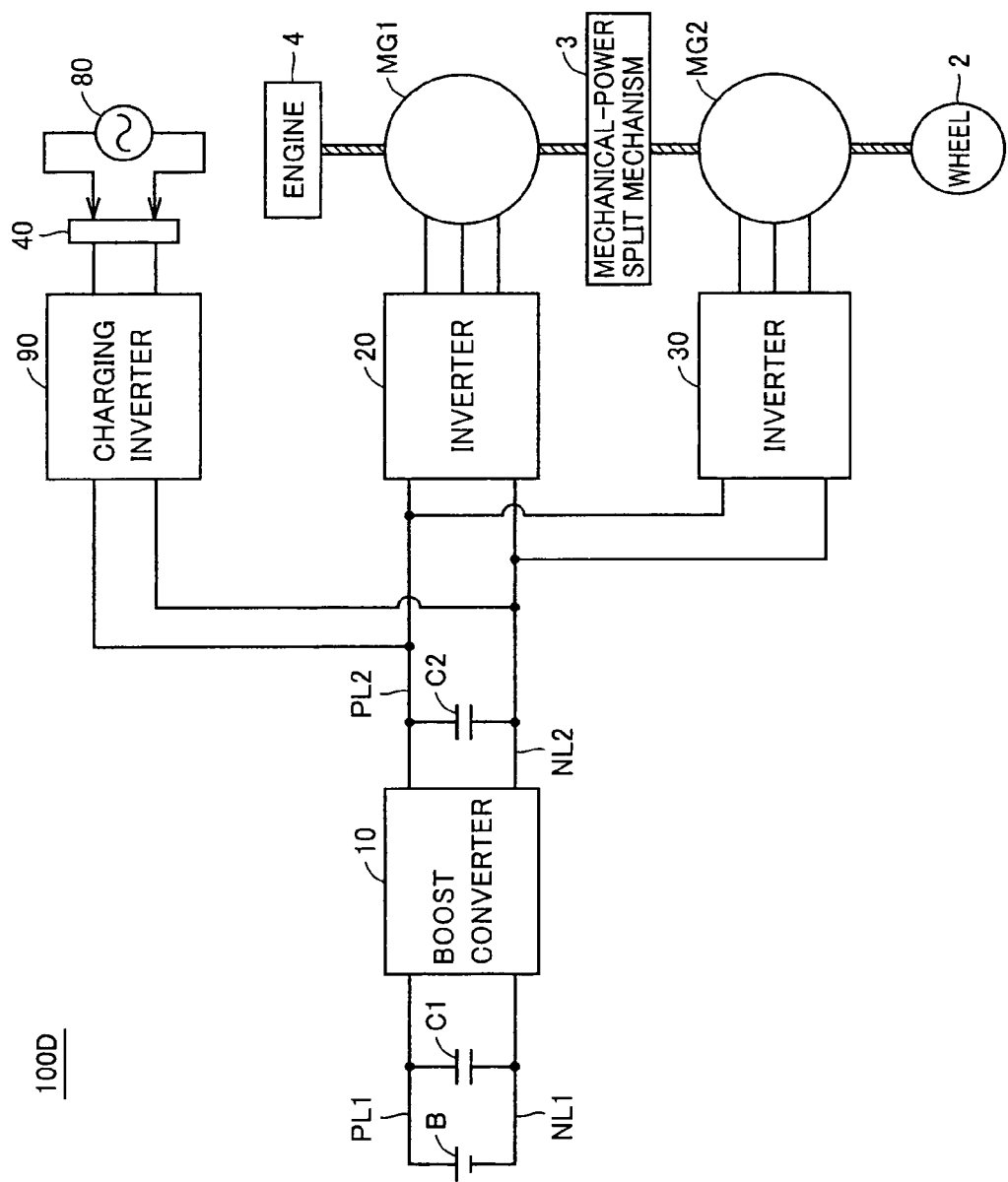
FIG. 17 shows a powertrain configuration of a hybrid vehicle that additionally includes a charging inverter.

FIG. 17 shows a powertrain configuration of a hybrid vehicle that additionally includes a charging inverter. With reference to FIG. 17, hybrid vehicle 100D further includes charging inverter 90 in addition to the configuration of hybrid vehicle 100 shown in FIG. 1.

Charging inverter 90 is connected to a positive polar line PL2 and a negative polar line NL2, receives AC power from an external power supply 80 through a charge plug 40, converts the AC power to DC power, and outputs the DC power to positive polar line PL2 and negative polar line NL2.

Then, a boost converter 10 converts the DC power, which is supplied from charging inverter 90 to positive polar line PL2 and negative polar line NL2, at a voltage level for power storage device B, so that power storage device B can be charged.

Herein, hybrid vehicle 100D is equal in configuration to hybrid vehicle 100 except the foregoing description. It is to be noted that an ECU 50, a memory unit 60 and a display unit 70 are not shown in FIG. 17.

In the respective embodiments described above, the hybrid vehicle has the configuration that power storage device B can be charged by external power supply 80. However, a range to which the present invention is applicable is not limited to the hybrid vehicle having such an external charging function. With the hybrid vehicle having the external charging function, the running distance in the EV mode is extended and the frequency of actuation of the engine is reduced, as described above. Therefore, the present invention is particularly suitable for a hybrid vehicle that allows considerable alienation between a total running distance of a vehicle and an engine-used running distance and has an external charging function.

In the foregoing description, there is mentioned a series/parallel-type hybrid vehicle in which mechanical-power split mechanism 3 splits the mechanical power of engine 4 into two and transmits the split power to each of the axle and motor-generator MG1, respectively. The present invention is also applicable to a so-called series-type hybrid vehicle in which only an engine 4 is used for driving a motor-generator MG1 and only a motor-generator MG2 generates a vehicle driving force or a motor-assisted hybrid vehicle in which an engine generates main mechanical power and a motor assists the engine if necessary.

In the case of the series-type hybrid vehicle, the hybrid vehicle starts to run in an EV mode while an engine is stopped with a power storage device being in a full-charge state. When an SOC of the power storage device falls below a predetermined threshold value, the engine starts to drive a generator. Thereafter, the hybrid vehicle runs in the EV mode while the engine generates electric power.

The present invention is also applicable to a hybrid vehicle including no boost converter 10.

In the respective embodiments described above, the control performed by the ECU is actually performed by a CPU (Central Processing Unit). The CPU reads from a ROM (Read Only Memory) a program having the respective steps in the flowchart, executes the read program, and executes the processes in accordance with the flowchart. Accordingly, the ROM corresponds to a computer (CPU)-readable recording medium recording the program having the respective steps in the flowchart.

In the foregoing description, engine 4 corresponds to an "internal combustion engine" according to the present invention, and motor-generator MG2 corresponds to a "rotating electric machine" according to the present invention. Moreover, each of first running distance computation unit 140 and first running time computation unit 170 corresponds to a "first running amount computation unit" according to the present invention, and each of second running distance computation unit 150 and second running time computation unit 180 corresponds to a "second running amount computation unit" according to the present invention. Further, motor-generator MG1 and inverter 20 form an "electric-power generation device" according to the present invention, and motor-generator MG1, motor-generator MG2, inverter 20 and inverter 30 form an "electric-power charge device" according to the present invention.

Furthermore, charge plug 40 corresponds to a "plug" according to the present invention, and motor-generator MG1 corresponds to "another rotating electric machine" according to the present invention. Moreover, inverter 20 and inverter 30 correspond to a "second inverter" and a "first inverter" according to the present invention, respectively, and electric power lines ACL1 and ACL2 correspond to a "pair of electric power lines" according to the present invention.

It should be considered that all the embodiments disclosed herein are merely illustrative and are not limitative. It is therefore understood that the scope of the present invention is defined by the appended claims rather than the foregoing description of the embodiments, and all changes that fall within metes and bounds of the claims, or equivalence of such metes and bounds thereof are intended to be embraced by the claims.

The invention claimed is:

1. A hybrid vehicle equipped with an internal combustion engine and a rotating electric machine serving as a mechanical power source for vehicle driving, having a first running mode during which said internal combustion engine is stopped and a second running mode during which said internal combustion engine is actuated, said hybrid vehicle comprising:
   a first running amount computation unit for computing a first status amount indicating a running amount in said first running mode;
   a second running amount computation unit for computing a second status amount indicating a running amount in said second running mode; and
   a determination unit for determining necessity of maintenance for elements included in the vehicle, based on said first and second status amounts, wherein
     said determination unit determines necessity of maintenance for said internal combustion engine and the elements actuated in accordance with the actuation of said internal combustion engine among said elements in the vehicle, based on said second status amount, and determines necessity of maintenance for the remaining elements, based on a third status amount indicating a total running amount of the vehicle; and
   a notification unit which issues, to a user, a notification of the necessity of maintenance for the elements included in the vehicle, based on a result of the determination by said determination unit.

2. The hybrid vehicle according to claim 1, wherein said third status amount is calculated by addition of said second status amount to said first status amount.

3. The hybrid vehicle according to claim 1, wherein
   said first status amount is a total running distance in said first running mode, and
   said second status amount is a total running distance in said second running mode.

4. The hybrid vehicle according to claim 3, wherein said second running amount computation unit calculates the total running distance in said second running mode from an assumed speed set in accordance with a load of said internal combustion engine.

5. The hybrid vehicle according to claim 4, further comprising:
a chargeable electric-power storage device for storing electric power consumed by said rotating electric machine; and
an electric-power generation device configured to be capable of charging said electric-power storage device through use of mechanical power of said internal combustion engine.

6. The hybrid vehicle according to claim 1, wherein
said first status amount is a total running time in said first running mode, and
said second status amount is a total running time in said second running mode.

7. The hybrid vehicle according to claim 1, wherein said first running amount computation unit calculates said first status amount by subtraction of said second status amount from said third status amount indicating a total running amount of the vehicle.

8. The hybrid vehicle according to claim 1, wherein said second running amount computation unit calculates said second status amount by subtraction of said first status amount from said third status amount indicating a total running amount of the vehicle.

9. The hybrid vehicle according to claim 1, further comprising a memory unit for storing said first and second status amounts.

10. The hybrid vehicle according to claim 1, further comprising a display unit for displaying said first and second status amounts.

11. The hybrid vehicle according to claim 1, further comprising a transmission unit for transmitting said first and second status amounts to outside of the vehicle.

12. The hybrid vehicle according to claim 1, further comprising a chargeable electric-power storage device for storing electric power consumed by said rotating electric machine, wherein
said electric-power storage device has such a capacity that the vehicle can run a distance of at least 10 km in said first running mode.

13. The hybrid vehicle according to claim 1, further comprising:
a chargeable electric-power storage device;
a plug capable of being connected to a power supply external to a vehicle; and
an electric-power charge device configured to be capable of receiving electric power from said plug, converting the electric power into voltage and charging said electric-power storage device.

14. The hybrid vehicle according to claim 13, further comprising another rotating electric machine which is different from said rotating electric machine, wherein
each of said rotating electric machine and said another rotating electric machine includes, as a stator winding, a star-connected multi-phase winding, and
said electric-power charge device includes
a first inverter which is provided in correspondence with said rotating electric machine,
a second inverter which is connected to said first inverter in parallel and is provided in correspondence with said another rotating electric machine,
a pair of electric power lines which connect said plug to a neutral point of the multi-phase winding of said rotating electric machine and a neutral point of the multi-phase winding of said another rotating electric machine, and
a charge control unit which controls said first and second inverters such that said first and second inverters convert electric power given to said neutral points from said power supply external to the vehicle through said pair of electric power lines into voltage to charge said electric-power storage device.

15. A control method for a hybrid vehicle equipped with an internal combustion engine and a rotating electric machine serving as a mechanical power source for vehicle driving, having a first running mode during which said internal combustion engine is stopped and a second running mode during which said internal combustion engine is actuated, said control method comprising:
a step of computing a first status amount indicating a running amount in said first running mode;
a step of computing a second status amount indicating a running amount in said second running mode; and
a step of determining necessity of maintenance for elements included in the vehicle, based on said first and second status amounts, wherein
necessity of maintenance for said internal combustion engine and the elements actuated in accordance with the actuation of said internal combustion engine among said elements in the vehicle is determined based on said second status amount, and necessity of maintenance for the remaining elements is determined based on a third status amount indicating a total running amount of the vehicle; and
a step of issuing, to a user, a notification of the necessity of maintenance for the elements included in the vehicle, based on a result of the determination.

16. The control method for the hybrid vehicle according to claim 15, wherein said third status amount is calculated by addition of said second status amount to said first status amount.

17. The control method for the hybrid vehicle according to claim 15, wherein
said first status amount is a total running distance in said first running mode, and
said second status amount is a total running distance in said second running mode.

18. The control method for the hybrid vehicle according to claim 17, wherein
in the step of computing the second status amount, the total running distance in said second running mode is calculated from an assumed speed set in accordance with a load of said internal combustion engine.

19. The control method for the hybrid vehicle according to claim 15, wherein
said first status amount is a total running time in said first running mode, and
said second status amount is a total running time in said second running mode.

20. The control method for the hybrid vehicle according to claim 15, wherein
in the step of computing the first status amount, said first status amount is calculated by subtraction of said second status amount from said third status amount indicating a total running amount of the vehicle.

21. The control method for the hybrid vehicle according to claim 15, wherein
in the step of computing the second status amount, said second status amount is calculated by subtraction of said first status amount from said third status amount indicating a total running amount of the vehicle.

22. The control method for the hybrid vehicle according to claim 15, further comprising a step of displaying said first and second status amounts.

23. The control method for the hybrid vehicle according to claim 15, further comprising a step of transmitting said first and second status amounts to outside of the vehicle.

24. A computer-readable recording medium recording a program for allowing a computer to execute the control method according to claim 15.

* * * * *